(12) United States Patent
Fujimaki et al.

(10) Patent No.: US 9,917,331 B2
(45) Date of Patent: Mar. 13, 2018

(54) METHOD FOR PRODUCING A SECONDARY BATTERY AND THE METAL CONTAMINANT DEACTIVATION OF THE SAME

(71) Applicant: TOYOTA JIDOSHA KABUSHIKI KAISHA, Toyota-shi, Aichi (JP)

(72) Inventors: Hisataka Fujimaki, Nisshin (JP); Hiroshi Kawadu, Toyota (JP)

(73) Assignee: TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 0 days.

(21) Appl. No.: 14/438,265

(22) PCT Filed: Oct. 2, 2013

(86) PCT No.: PCT/JP2013/076782
§ 371 (c)(1),
(2) Date: Apr. 24, 2015

(87) PCT Pub. No.: WO2014/077045
PCT Pub. Date: May 22, 2014

(65) Prior Publication Data
US 2015/0255833 A1 Sep. 10, 2015

(30) Foreign Application Priority Data

Nov. 13, 2012 (JP) ................. 2012-249310

(51) Int. Cl.
| | |
|---|---|
| H01M 10/42 | (2006.01) |
| H01M 2/16 | (2006.01) |
| H01M 4/04 | (2006.01) |
| H01M 10/44 | (2006.01) |
| H01G 11/52 | (2013.01) |
| H01M 10/04 | (2006.01) |
| H01M 10/0525 | (2010.01) |

(52) U.S. Cl.
CPC ........ H01M 10/4242 (2013.01); H01G 11/52 (2013.01); H01M 2/1653 (2013.01);
(Continued)

(58) Field of Classification Search
None
See application file for complete search history.

(56) References Cited

U.S. PATENT DOCUMENTS

| | | | | |
|---|---|---|---|---|
| 5,830,603 A | * | 11/1998 | Oka .................. | H01M 2/145 204/296 |
| 6,296,969 B1 | | 10/2001 | Yano et al. | |

(Continued)

FOREIGN PATENT DOCUMENTS

| | | | |
|---|---|---|---|
| JP | 07161343 A | * | 6/1995 |
| JP | 11-283603 A | | 10/1999 |

(Continued)

OTHER PUBLICATIONS

EN translation of JP2005243537A—2005.*
En Translation of JP2011-228119A—2005.*
JP 2002208440 A EN translation 2002.*

*Primary Examiner* — Lucas J O Donnell
(74) *Attorney, Agent, or Firm* — Sughrue Mion, PLLC

(57) ABSTRACT

Provided are a secondary battery having a configuration with which localized metal contaminant precipitation at the negative electrode can be reliably inhibited in less time, and a method for producing a secondary battery that allows reliable deactivation of metal contaminant in less time. The battery comprises a positive electrode, a negative electrode, and a separator placed between the two electrodes. The separator has an air resistance $Rp \leq 100$ sec in an in-plane direction vertical to its thickness direction and an air resistance $Rt > Rp$ in the thickness direction. The method comprises a minimal charging step where the cell is charged to 0.01% to 0.5% capacity over at least one hour to obtain a state of charge where the positive and negative electrode potentials are at or above the oxidation and reduction potentials of a probable metal contaminant, respectively; and a step of performing initial conditioning charging.

6 Claims, 15 Drawing Sheets

(52) U.S. Cl.
CPC ....... *H01M 2/1686* (2013.01); *H01M 4/0445* (2013.01); *H01M 10/04* (2013.01); *H01M 10/446* (2013.01); *H01M 10/0525* (2013.01); *H01M 2200/00* (2013.01); *Y02E 60/13* (2013.01); *Y02T 10/7022* (2013.01); *Y10T 29/49108* (2015.01)

(56) References Cited

U.S. PATENT DOCUMENTS

2010/0203396 A1* 8/2010 Murata ............... H01M 2/1653
429/247

2011/0052987 A1* 3/2011 Katayama ........... H01M 2/1646
429/221
2011/0269010 A1 11/2011 Sawaguchi et al.
2012/0321926 A1 12/2012 Hojo

FOREIGN PATENT DOCUMENTS

| JP | 2002-166218 A | | 6/2002 |
|---|---|---|---|
| JP | 2002208440 A | * | 7/2002 |
| JP | 2005-243537 A | | 9/2005 |
| JP | 2011-113915 A | | 6/2011 |
| JP | 2011-228119 A | | 11/2011 |
| JP | 2012-049040 A | | 3/2012 |
| WO | 2011-111153 A1 | | 9/2011 |
| WO | 2012/077226 A1 | | 6/2012 |

* cited by examiner

[Fig. 1]
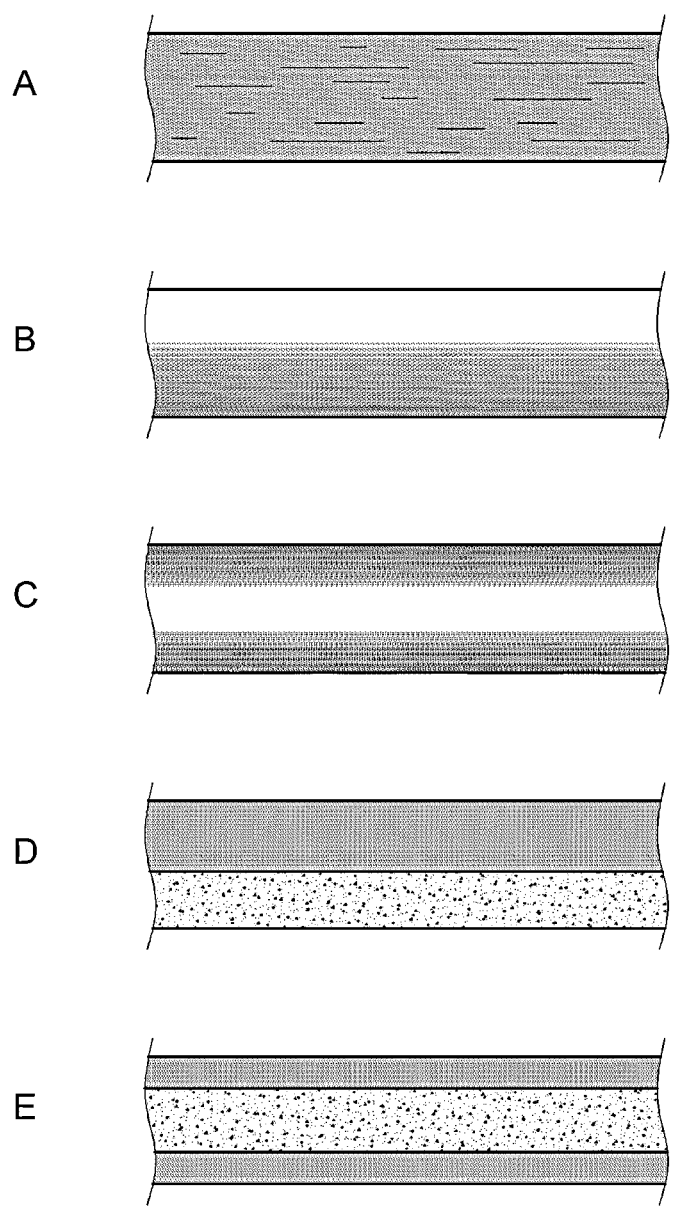

[Fig. 2]
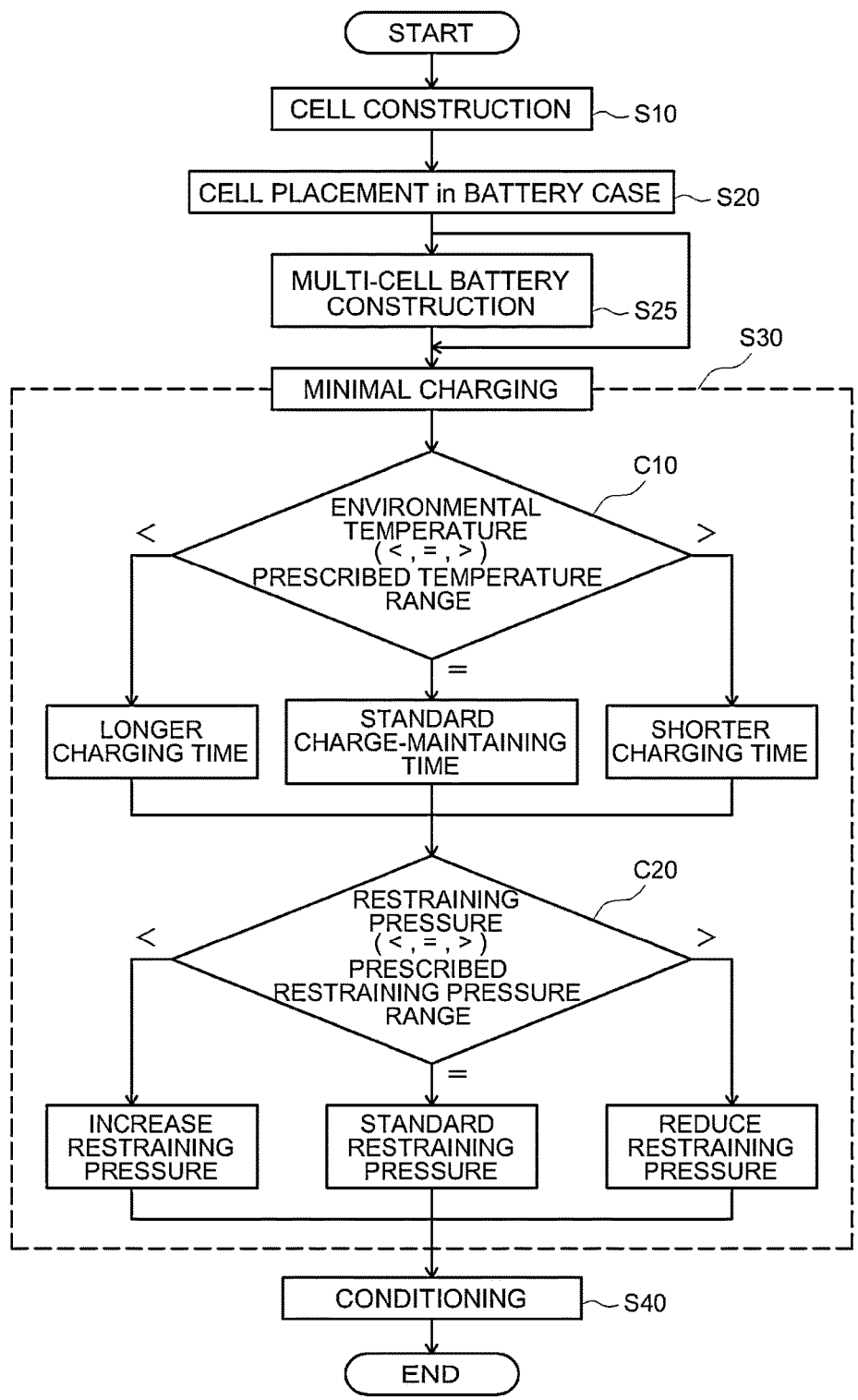

[Fig. 3]
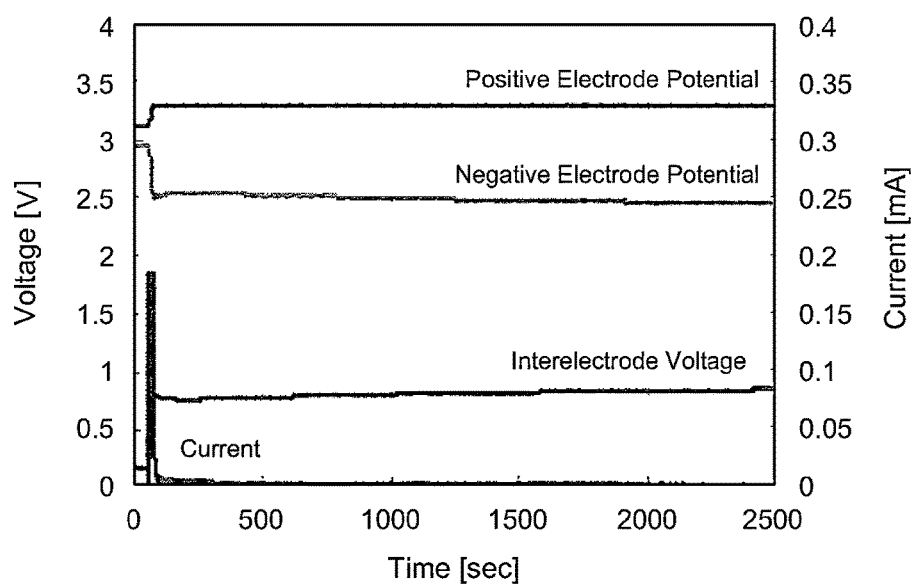
[Fig. 4]
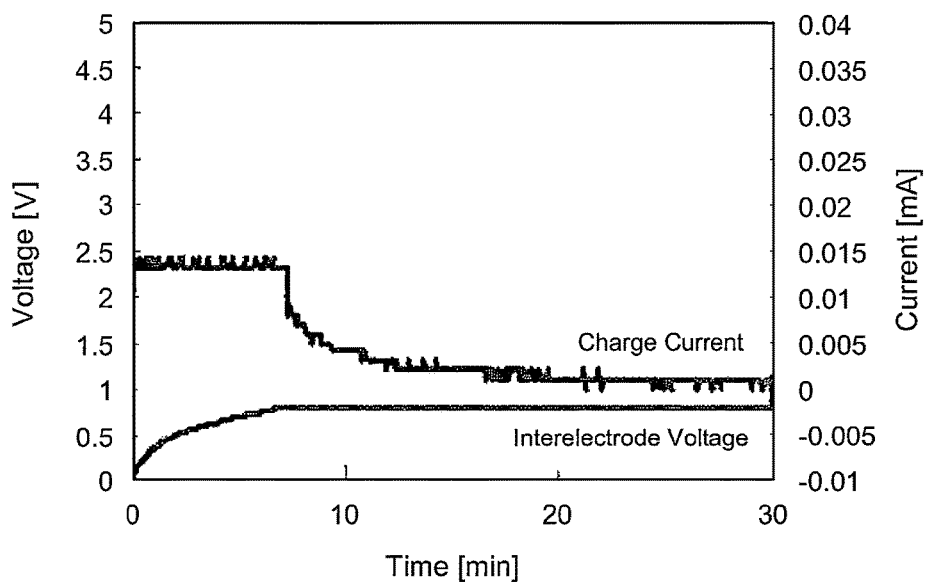

[Fig. 5]
(A)
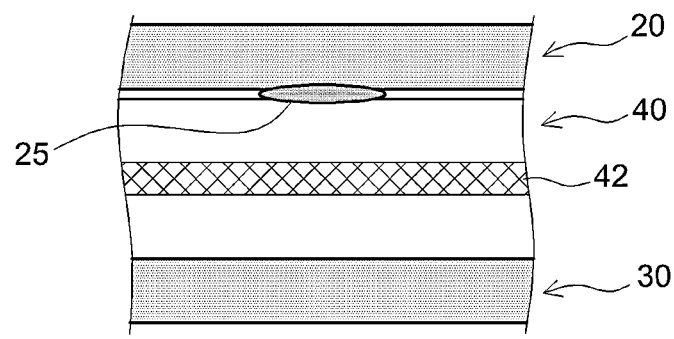
(B)
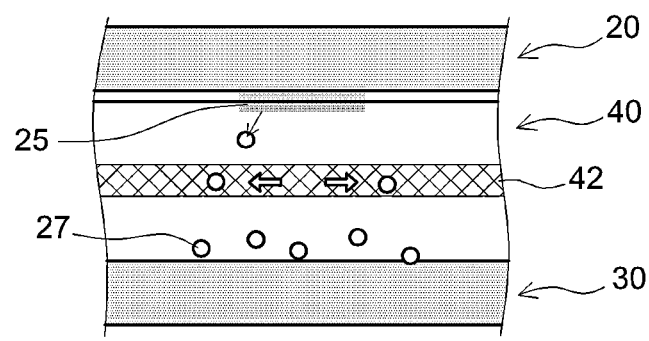
(C)
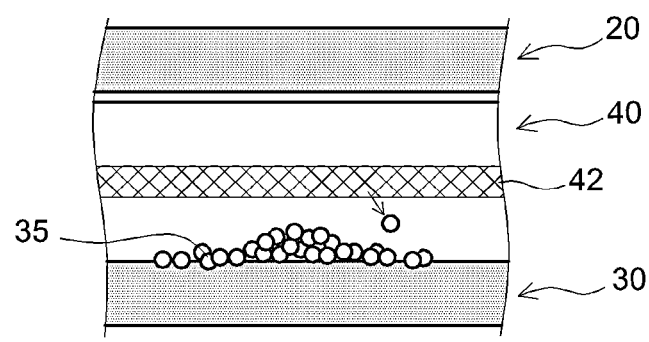

[Fig. 6A]
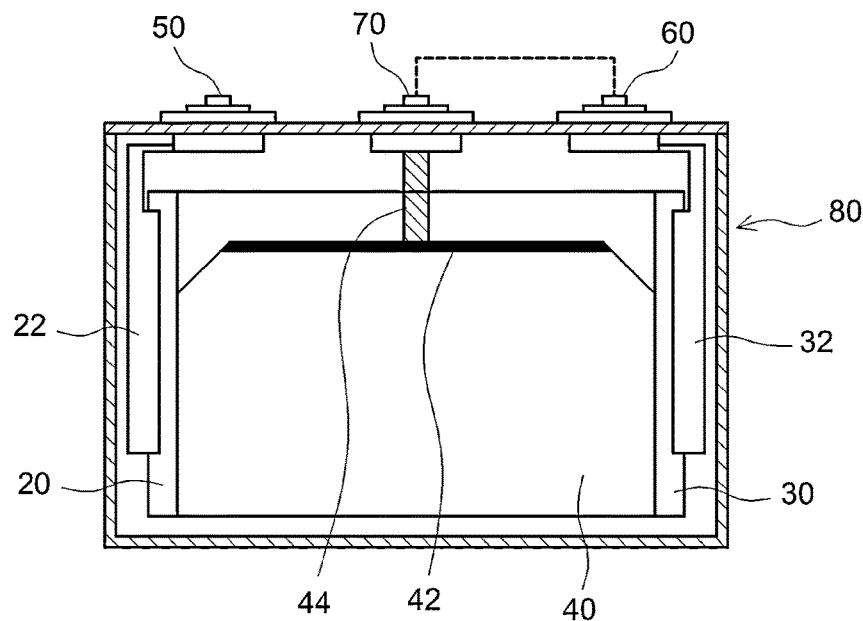
[Fig. 6B]
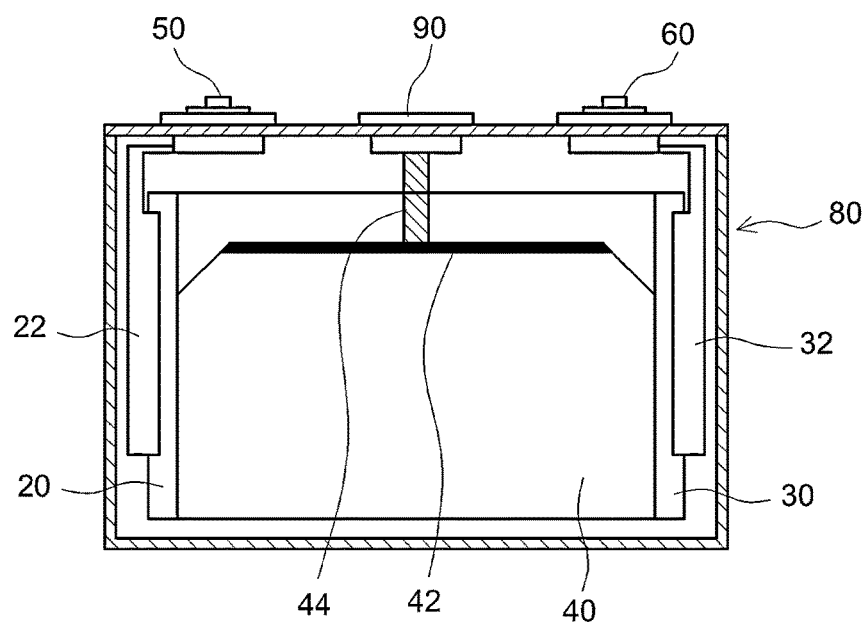

[Fig. 7A]
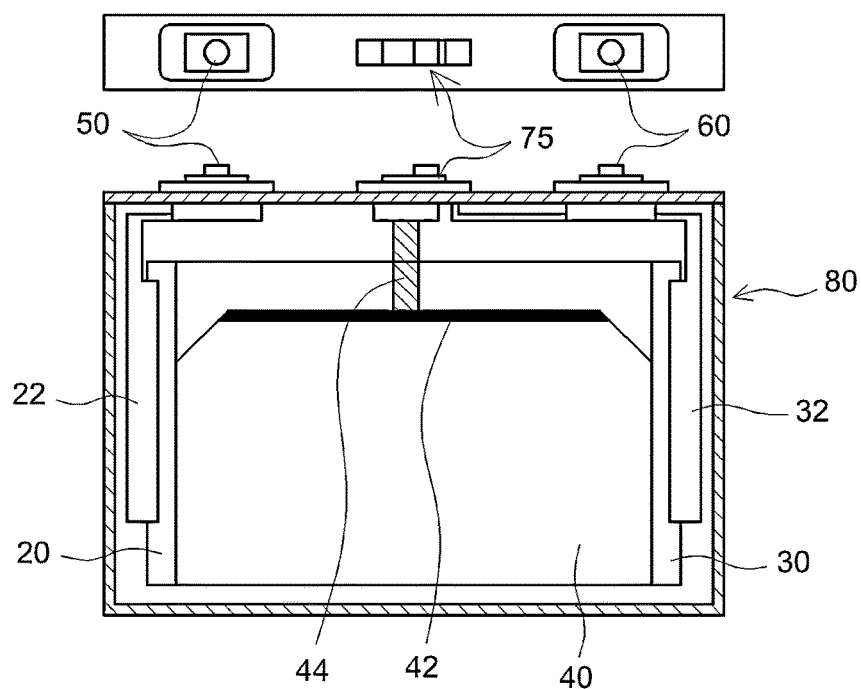
[Fig. 7B]
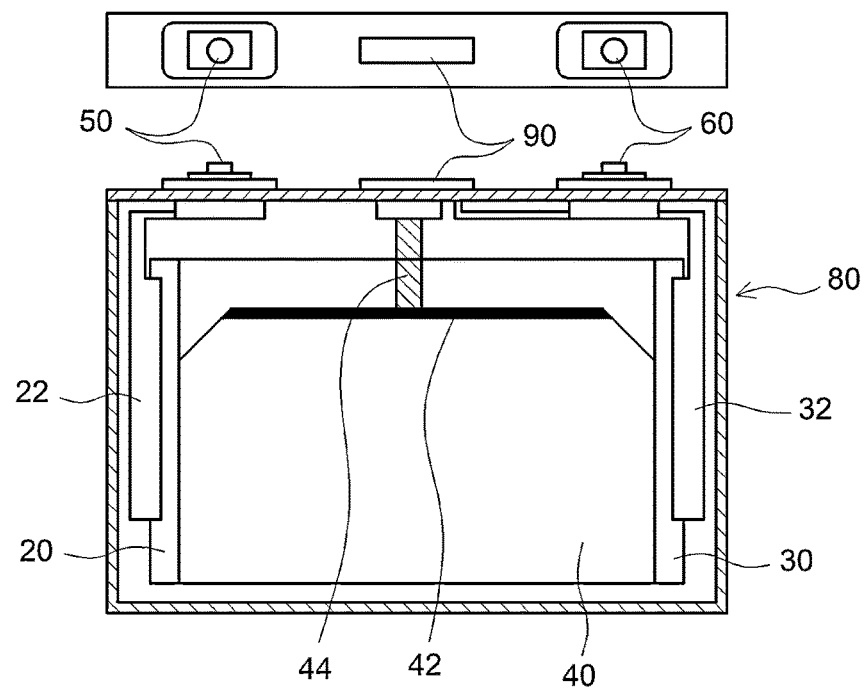

[Fig. 8]
(A)
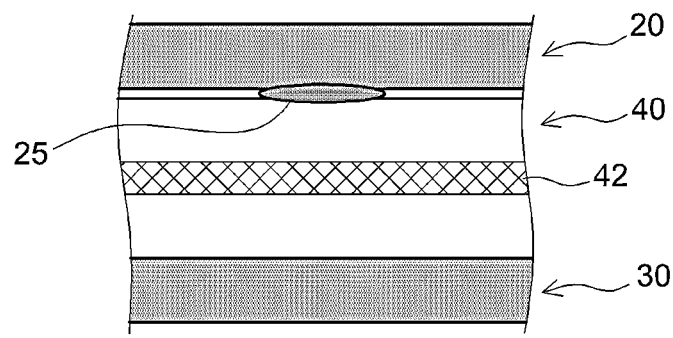
(B)
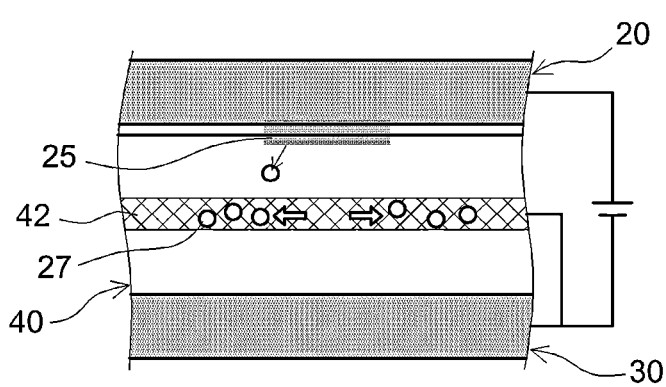
(C)
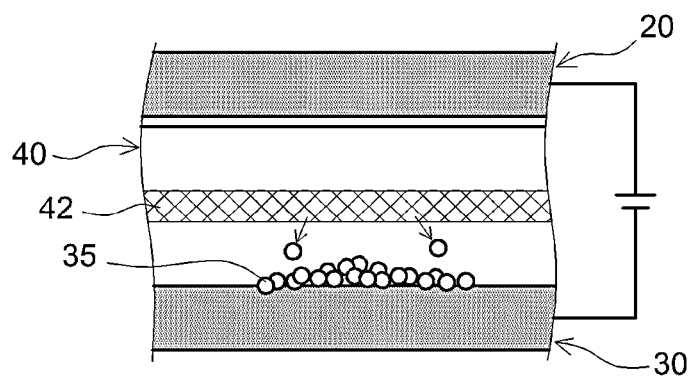

[Fig. 9]
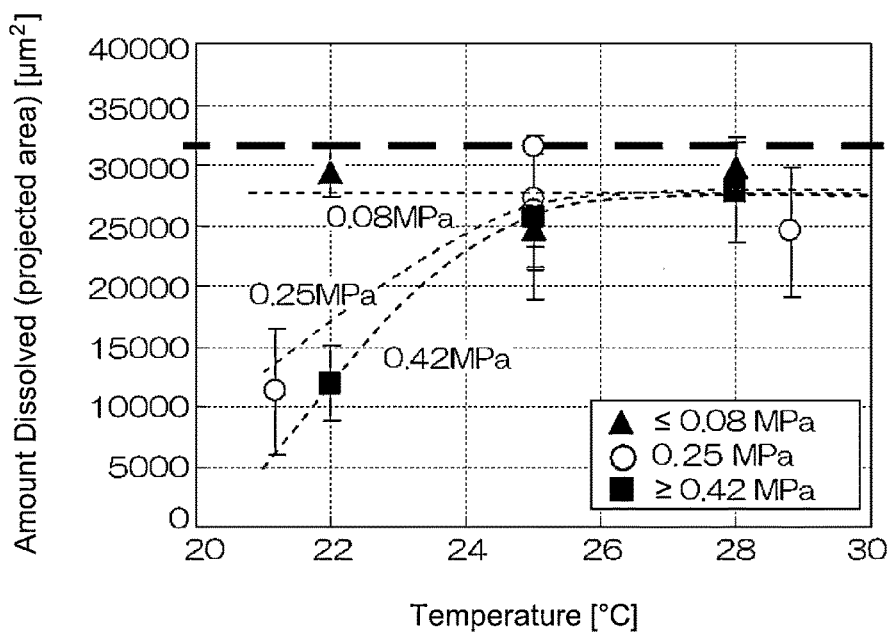
[Fig. 10]
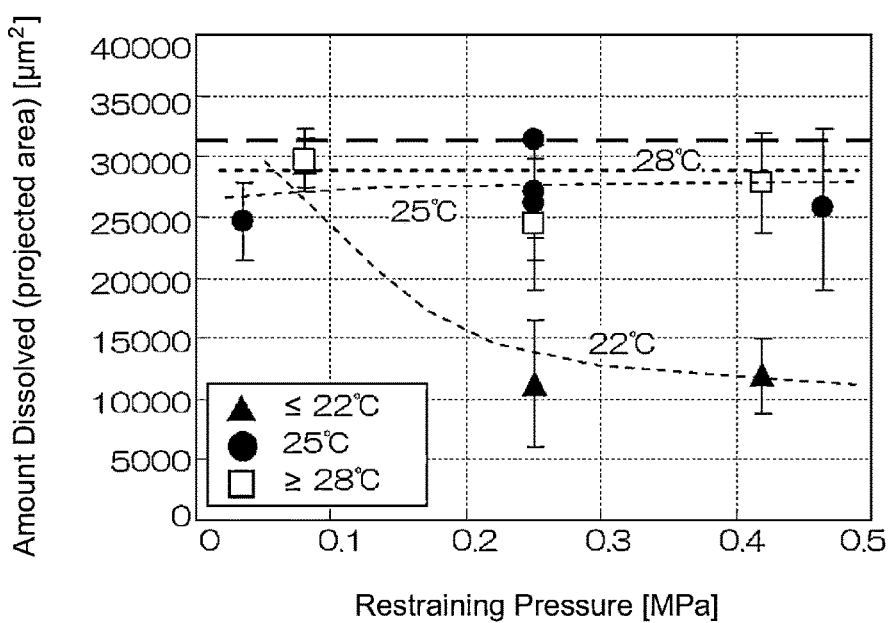

[Fig. 11]
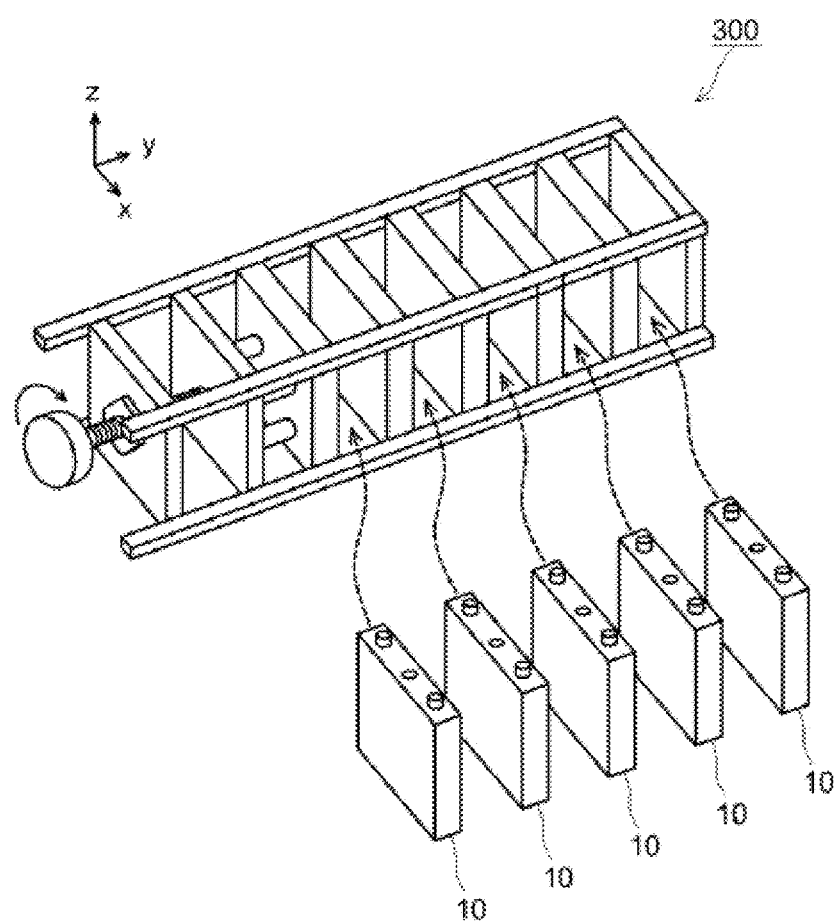

[Fig. 12]
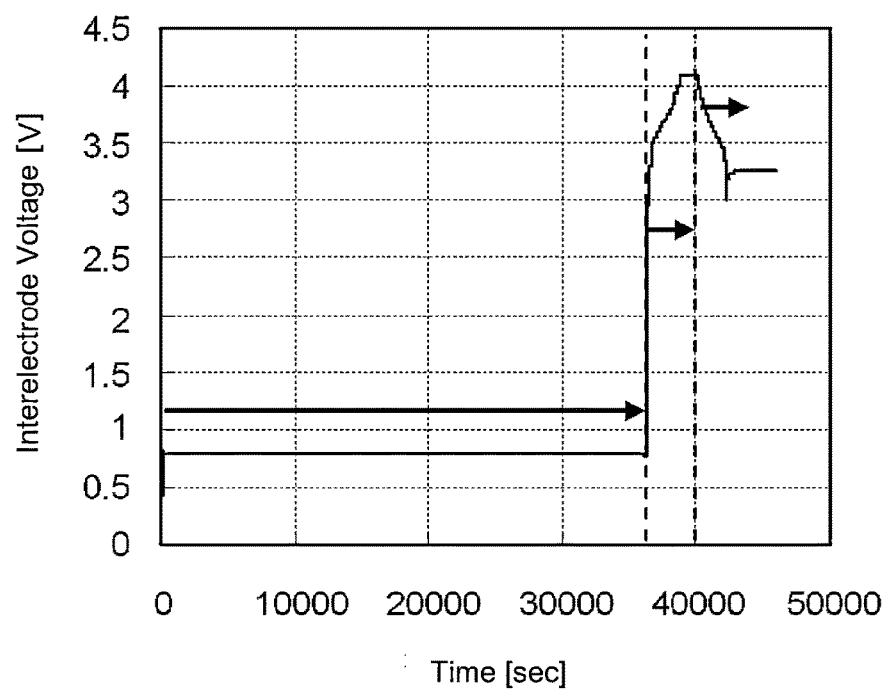

[Fig. 13]
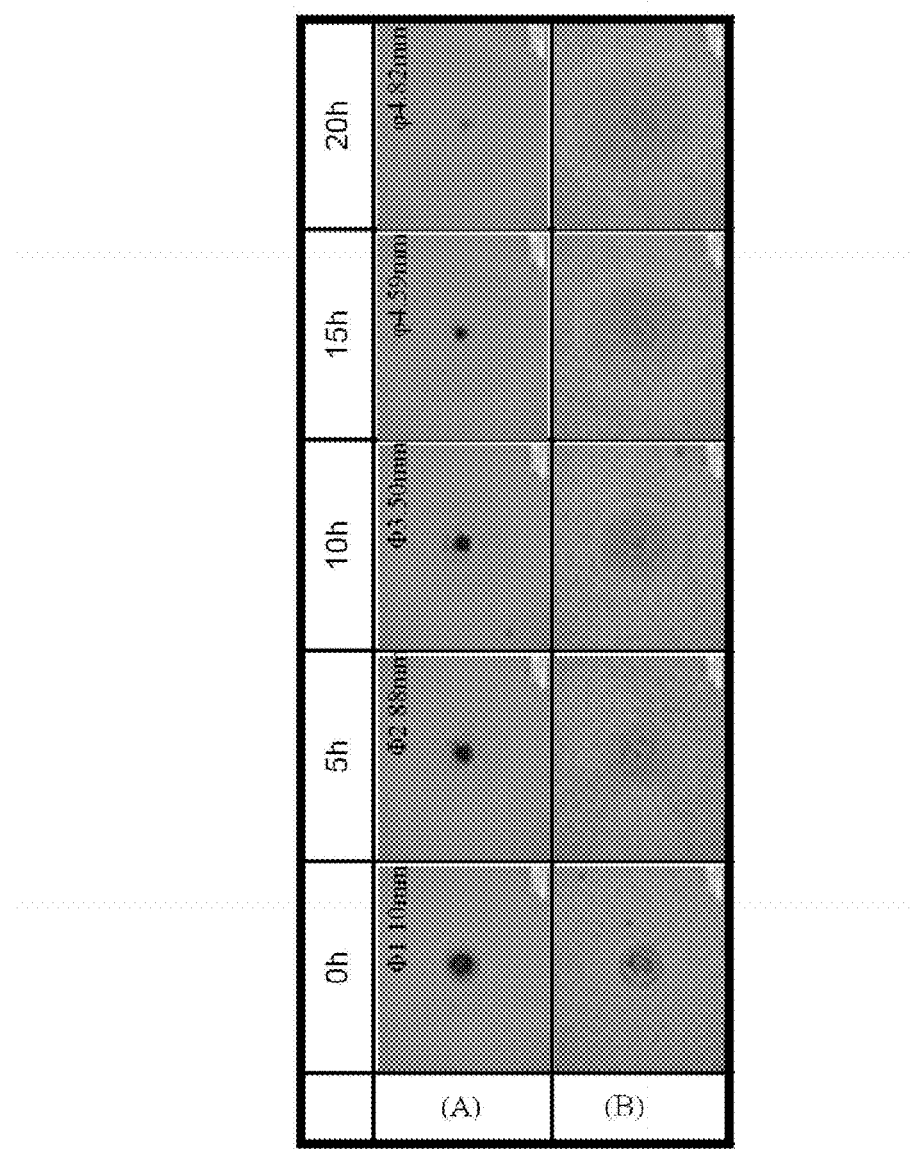

[Fig. 14]
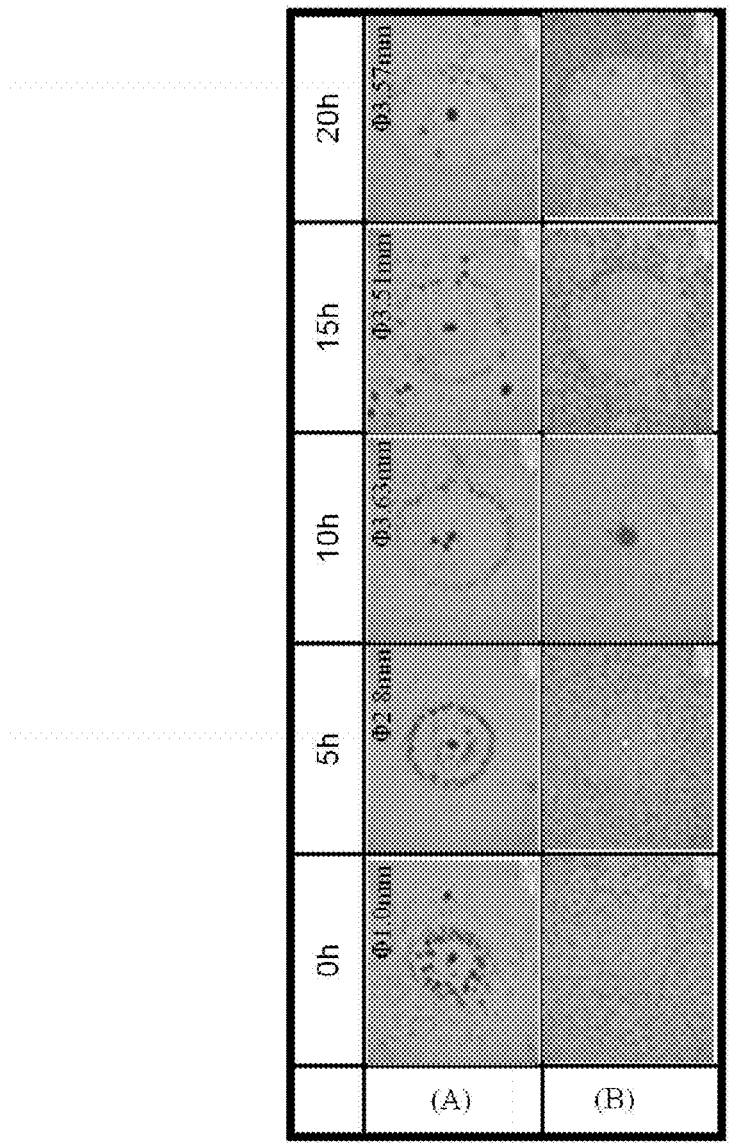

[Fig. 15]
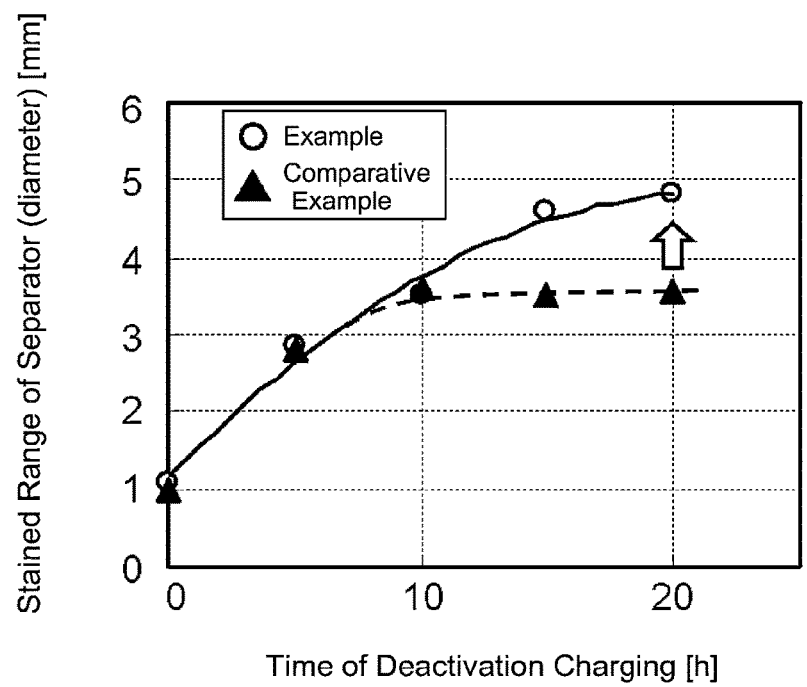
[Fig. 16]
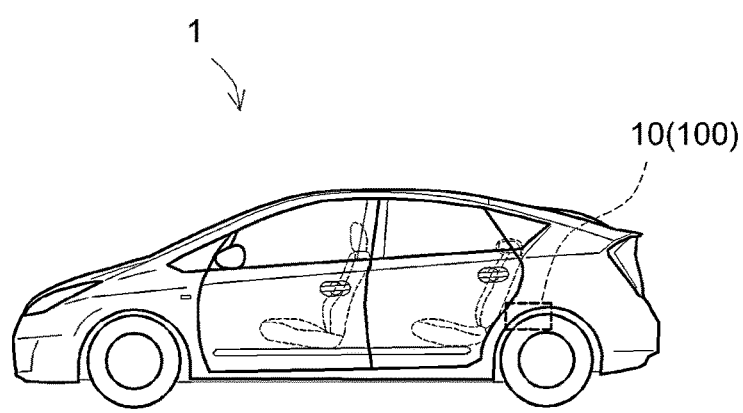

[Fig. 17A]
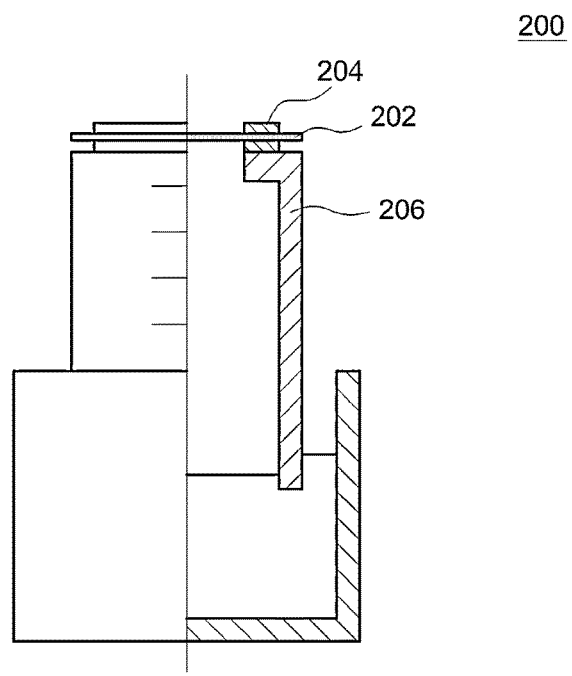
[Fig. 17B]
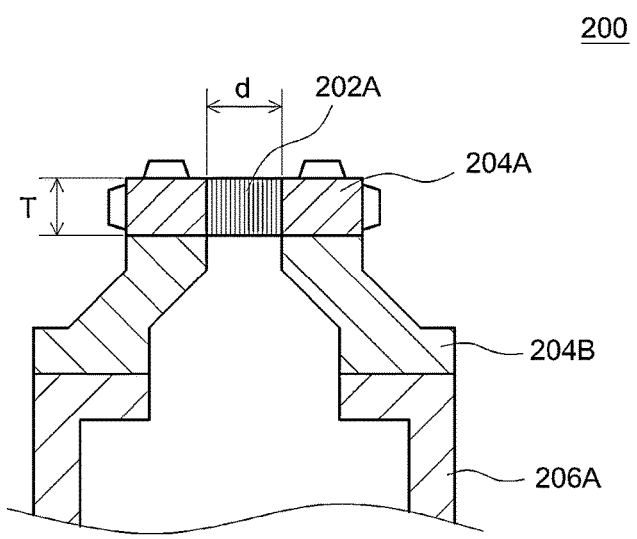

[Fig. 18A]
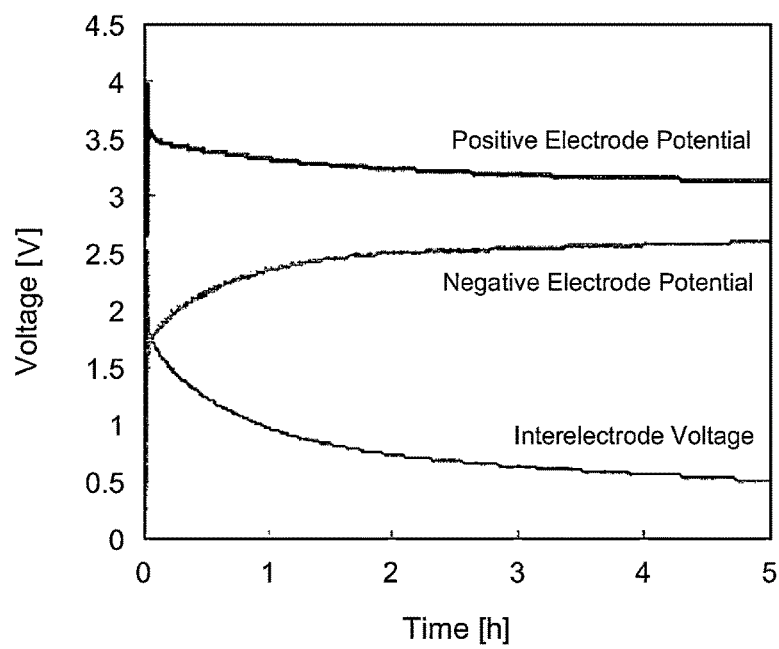
[Fig. 18B]
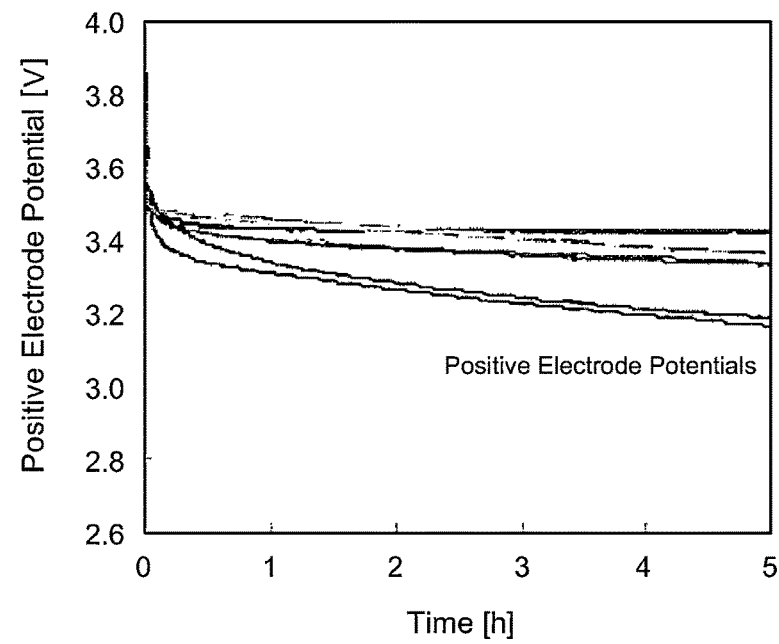

METHOD FOR PRODUCING A SECONDARY BATTERY AND THE METAL CONTAMINANT DEACTIVATION OF THE SAME

TECHNICAL FIELD

The present invention relates to a secondary battery and a method for producing the same. In particular, it relates to a secondary battery in which a short circuit caused by precipitates of a metal contaminant therein is prevented, and further relates to a method for producing the same.

The present application is a National Stage of International Application No. PCT/JP2013/076782 filed Oct. 2, 2013, claiming priority based on Japanese Patent Application No. 2012-249310 filed on Nov. 13, 2012, the contents of all of which are incorporated herein by reference in their entirety.

BACKGROUND ART

Heretofore, secondary batteries have been widely used, such as lithium secondary batteries, etc. A lithium secondary battery typically comprises positive and negative electrodes comprising positive and negative electrode active materials capable of storing and releasing lithium ions, respectively, a separator to electrically insulate the positive electrode and negative electrode, and a non-aqueous electrolyte impregnated in the positive electrode, negative electrode and separator. In producing a lithium secondary battery, a positive electrode and a negative electrode are layered via a separator to constitute an electrode assembly; the electrode assembly is placed in a battery case and impregnated with a non-aqueous electrolyte to construct a secondary battery; and the secondary battery is subjected to initial conditioning charging.

In producing the secondary battery, it is known that a metal contaminant such as iron (Fe) can be inevitably mixed in from the outside. When the metal contaminant is present on or near the positive electrode, the metal contaminant dissolves into the non-aqueous electrolyte during charging of the secondary battery (e.g. during initial conditioning and during the use), and precipitate out gradually and locally in the opposite area on the negative electrode. It has been reported that if the metal contaminant is large in size, the precipitates will pierce through the separator to cause a short circuit.

Accordingly, it has been suggested that after a secondary battery is constructed, but before it is subjected to initial conditioning charging, the secondary battery be subjected to a process to prevent a short circuit caused by such a metal contaminant (or "metal contaminant deactivation (harm minimization, risk control) process" hereinafter) (e.g. see Patent Document 1).

For instance, Patent Document 1 discloses a secondary battery production method in which a secondary battery is initially charged to 0.01% to 0.1% of the secondary battery capacity and then left standing for 1 hour to 48 hours. It is disclosed that according to such a method, by the initial charging, dissolved metal ions are diffused in the electrolyte solution, allowing prevention of local precipitation of the metal on the negative electrode during subsequent charges.

CITATION LIST

Patent Literature

[Patent Document 1] Japanese Patent Application Publication No. 2005-243537

[Patent Document 2] Japanese Patent Application Publication No. 2012-049040

[Patent Document 3] Japanese Patent Application Publication No. 2011-228119

[Patent Document 4] Japanese Patent Application Publication No. 2011-113915

[Patent Document 5] Japanese Patent Application Publication No. H11-283603

SUMMARY OF INVENTION

Technical Problem

It has been found that in testing the method disclosed in Patent Document 1 to deactivate a metal contaminant on positive electrodes in some secondary batteries, it can sometimes require relatively long time (e.g. 48 hours or more) to completely dissolve the metal contaminant. In the deactivation process, the initial negative electrode potential could be lower than the redox potential of Fe (e.g. 2.5 V vs. Li/Li$^+$), for instance. Thus, when Fe is contained as a metal contaminant, it is likely to precipitate out on the negative electrode.

On the other hand, some charge controllers and secondary battery configurations have been suggested for preventing precipitation of lithium metal and manganese originating from positive electrode active materials (e.g. see Patent Documents 2 and 3). Such techniques prevent dissolution and precipitation of lithium metal and manganese both originating from battery components, namely charge carriers and positive electrode active materials. However, they do not prevent precipitation of a metal contaminant that is not part of battery components, but is likely to be mixed in during a production process.

Separately from a deactivation process of metal contaminant as described above, a self-discharge test is generally performed on an initially charged and conditioned secondary battery to measure the voltage drop (self-discharge capacity) in a load-free state so as to assess the presence of an internal short circuit. The self-discharge test checks the presence of a minor short circuit caused by precipitates of a metal contaminant. However, for identifying the presence of a minor short circuit caused by precipitates of highly resistant iron, it has been necessary to run a test over five days or more, for instance, about 10 days. Accordingly, when the deactivation process is unlikely to bring about complete dissolution of the metal contaminant, it has been necessary to conduct the self-discharge test over at least several days.

The present invention has been made to solve the conventional problem as described above. An objective thereof is to provide a secondary battery having a configuration with which localized precipitation of a metal contaminant at the negative electrode can be reliably inhibited in less time. Another objective of the present invention is to provide a method for producing a secondary battery on which a deactivation process of metal contaminant can be reliably performed in less time.

Solution to Problem

To solve the problem, the present application provides an invention as described below.

In view of the circumstances about the conventional art, a secondary battery provided by the present invention comprises a positive electrode, a negative electrode, and a separator placed between the positive electrode and the negative electrode. In such a secondary battery, the separator is characterized by having an air resistance Rp of 100 sec or less in an in-plane direction vertical to its thickness direction and an air resistance Rt in the thickness direction higher than the air resistance Rp in the in-plane direction.

A metal contaminant mixed in a positive electrode or in its vicinity during a production process of a secondary battery dissolves to form metal ions when the voltage across the positive and negative electrodes becomes higher than the redox potential of the metal contaminant. The metal ions move inside the separator from the positive electrode side to the negative electrode side, and are reduced to precipitate as the metal on the negative electrode surface. In this invention, the facility of the separator to allow diffusion of metal ions within itself is assessed by the air resistance R. The separator in the secondary battery of this invention has air resistance R satisfying the conditions described above and thus has a structure to facilitate migration of metal ions in in-plane directions than in the thickness direction of the separator. Since the separator has suitable air resistance in the thickness direction, it may have mechanical strength generally required from a separator. Such a structure facilitates metal ions, in migrating from the positive electrode side to the negative electrode side, to diffuse inside the plane of the separator. Accordingly, for instance, when such a secondary battery is subjected to a metal contaminant deactivation process, diffusion of metal ions is facilitated to complete the deactivation process in less time.

In a preferable embodiment of the secondary battery disclosed herein, the separator is characterized by having a multi-layer structure formed of two or more layers including a porous resin layer and a diffusion layer that is formed from a conductive material or an insulating material and has an air resistance Rp of less than 100 sec in an in-plane direction vertical to its thickness direction.

The separator formed in such a multi-layer structure with at least two layers can preferably ensure the mechanical strength while facilitating diffusion of metal ions. The diffusion layer has a particularly favorable structure for migration and diffusion of metal ions, and thus a secondary battery more suitable for a metal contaminant deactivation process is provided.

In a preferable embodiment of the secondary battery disclosed herein, the diffusion layer is characterized by being formed of one, two or more species selected from a group consisting of a porous body, a non-woven fabric and a woven fabric.

Such a structure can be designed to have desirable form and properties, and produced from any one of an organic material, an inorganic material or a metal material, or from a composite material of these. With the diffusion layer having such a structure, a secondary battery more suitable for a metal contaminant deactivation process is provided.

Another embodiment of the secondary battery disclosed herein to achieve the objective is a secondary battery comprising a positive electrode, a negative electrode, and a separator placed between the positive electrode and the negative electrode, characterized in that the separator has an air resistance Rt in its thickness direction higher than the air resistance Rp in the in-plane direction vertical to the thickness direction while having a multi-layer structure formed of at least two layers including a porous resin layer and a diffusion layer formed from a conductive material, and that a system capable of electrically connecting the diffusion layer and the negative electrode is included.

According to such a configuration, in a metal contaminant deactivation process, the diffusion layer and the negative electrode can be at the same electric potential. When the diffusion layer and negative electrode have the same electric potential, migration of metal ions from the separator to the negative electrode is not facilitated. Thus, upon arrival at the separator, metal ions dissolved from a metal contaminant at the positive electrode are further inclined to diffuse inside the separator. In other words, the metal contaminant mixed in the positive electrode can be deactivated to a diffused state in less time.

In the invention, the separator preferably has an air resistance Rp of 100 sec or less in an in-plane direction vertical to its thickness direction. Such a structure further facilitates diffusion of metal ions in in-plane directions of the separator, requiring less processing time for sufficient diffusion of the metal ions inside the plane of the separator.

In a preferable embodiment, the secondary battery disclosed herein is characterized by comprising a battery case that houses the positive electrode, the negative electrode and the separator, with the battery case having an external positive terminal, an external negative terminal and an external separator terminal; and by the diffusion layer being electrically connected via a conductive member to the external separator terminal.

According to such a configuration, connection between the external separator terminal and external negative terminal allows the diffusion layer and negative electrode to be at the same potential. Thus, the deactivation process can be performed more easily on the secondary battery upon construction.

The secondary battery above of this invention has a configuration preferred for a metal contaminant deactivation process. When a secondary battery having such a configuration is subjected to a deactivation process, the metal contaminant is accumulated in a more uniformly diffused form on the negative electrode. Accordingly, in the secondary battery provided by this invention, a metal contaminant that had been mixed in the positive electrode may be present as precipitates in a more uniformly diffused and thereby deactivated (harmless) state on the negative electrode.

In another aspect, the present invention provides a method for producing a secondary battery comprising a positive electrode, a negative electrode, and a separator placed between the positive electrode and the negative electrode. The production method is characterized by comprising a step of constructing a cell comprising a positive electrode, a negative electrode, and a separator having an air resistance Rp of 100 sec or less in an in-plane direction vertical to its thickness direction and an air resistance Rt in the thickness direction higher than the air resistance Rt in the in-plane direction; a step of placing the constructed cell in a battery case; a minimal charging step comprising charging the cell (battery) to 0.01% to 0.5% of the cell capacity over at least one hour to obtain a state of charge such that the positive electrode has a potential equal to or above the oxidation potential of a probable metal contaminant while the negative electrode has a potential equal to or above the reduction potential of the probable metal contaminant, and further maintaining the state of charge; and a step of performing initial conditioning charging.

In the production method of this invention, after the cell is constructed, the minimal charging step is carried out prior to the initial conditioning charging step. In the minimal charging step, the cell is charged slowly with minimal current equivalent to 0.01% to 0.5% of the cell capacity over a sufficient time period of at least one hour. By such a slow charging mode, the negative electrode potential is inhibited from decreasing and rapidly increasing; dissolution of a metal contaminant is facilitated at the positive electrode; and the metal contaminant is reliably prevented from precipitating out at the negative electrode.

In the present description, the term "cell" refers to a power-generating unit formed of a positive electrode, a negative electrode and a separator. The "cell capacity" is not strictly limited to the capacities of individual secondary batteries constructed, but may refer to their rated capacity. In other words, the range of "0.01% to 0.5%" in relation to the cell capacity defined above indicates a numerical range that takes into account differences of the exact capacities of individual secondary batteries from their rated capacity.

In such a minimal charging step, the dissolved metal ions can be present in an electrolyte. In the separator between the positive and negative electrodes, metal ions can migrate easily in in-plane directions. Thus, by taking full advantage of the period of the minimal charging step, the metal ions can diffuse throughout the electrolyte almost uniformly.

These metal ions uniformly diffused in the electrolyte precipitate out in the diffused state on the negative electrode during the initial conditioning charging step after the minimal charging step. Accordingly, the metal contaminant is deactivated without locally precipitating out.

For instance, the oxidation potential and reduction potential of the probable metal contaminant may be the same under ideal conditions. In reality, however, due to the influence of additive(s) in the electrolyte and electrode materials, etc., the potential at which oxidation reaction proceeds and the potential at which reduction reaction proceeds may not be the same (called overvoltage). Thus, in the present description, these are distinguished.

In a preferable embodiment, the secondary battery production method disclosed herein is characterized in that the cell is constructed, using, as the separator, a separator having a multi-layer structure formed of two or more layers including a porous resin layer and a diffusion layer that is formed from a conductive material or an insulating material and has an air resistance Rp of less than 100 sec in an in-plane direction vertical to the thickness direction.

A separator having such a structure ensures mechanical strength and allows diffusion of metal ions; and therefore, a secondary battery of higher quality can be produced. Since the diffusion layer has a particularly favorable structure for metal ions to migrate and diffuse, the metal contaminant can be deactivated more reliably in less time.

In the secondary battery production method disclosed herein, the diffusion layer is preferably formed of one, two or more species selected from a group consisting of a porous body, a non-woven fabric and a woven fabric.

Such a diffusion layer can be designed to have desirable form and properties, and produced from any one of an organic material, an inorganic material or a metal material, or from a composite material of these. For instance, the diffusion layer can be formed thinner while securing strength and having low air resistance. By this, the metal contaminant can be preferably deactivated, for instance, without negatively affecting the design of the secondary battery.

In a preferable embodiment, the secondary battery production method disclosed herein is characterized in that the diffusion layer is formed from a conductive material; the battery case is equipped with a system capable of electrically connecting the diffusion layer and the negative electrode at least during the minimal charging step; and in the minimal charging step, the charging is performed while the diffusion layer and the negative electrode are electrically connected.

Because the diffusion layer and negative electrode are at the same potential in the metal contaminant deactivation process, such a configuration does not lead to migration of metal ions from the separator to the negative electrode in a potential gradient. Accordingly, after having reached the separator, metal ions dissolved from a metal contaminant at the positive electrode are further inclined to diffuse inside the separator. In other words, the metal contaminant mixed in the positive electrode can be deactivated to a diffused state in less time.

In a preferable embodiment, the secondary battery production method disclosed herein is characterized in that the minimal charging step is carried out by constant-current, constant-voltage charging; and that the resulting state of charge is maintained for 5 hours or more, but 20 hours or less.

The method of this invention may strongly facilitate dissolution of a metal contaminant, and thus the metal contaminant deactivation process can be completed in less time. By any chance if some metal contaminant remains on the positive electrode surface, the already deactivated metal contaminant is accumulated on the negative electrode, diffused over a larger area than in the conventional art, whereby the likelihood of a short circuit can be sufficiently reduced. Accordingly, maintaining the state of charge can be finished typically in 5 hours or more, but 20 hours or less, or more definitively in about 5 hours or more, but 18 hours or less, for instance, in about 5 hours or more, but 15 hours or less.

In a preferable embodiment, the secondary battery production method disclosed herein is characterized by further comprising, after the initial conditioning charging step, a self-discharge test step in which the charged cell is subjected to a measurement of voltage drop; and that the self-discharge test step is completed in 12 hours or less.

According to the production method, since the metal contaminant can be more reliably deactivated, the likelihood of a short circuit caused by localized precipitation of the metal contaminant is sufficiently reduced in the secondary battery after the initial conditioning charging step. Especially when iron (Fe) is expected as a metal contaminant, it can even reduce the likelihood of a short circuit caused by the highly resistant, slow-dissolving (requires time to dissolve) metal contaminant (iron (Fe)). Accordingly, when subsequently performing the self-discharge test, free from concerns of a possible short circuit caused by a highly resistant, slow-dissolving metal contaminant (typically, iron (Fe), an alloy thereof, etc.), the self-discharge test can be done in notably short time, such as 12 hours or less.

The present invention as described above can provide a highly reliable secondary battery in which any metal contaminant is substantially completely deactivated with a sufficiently reduced likelihood of a short circuit caused by localized precipitation of the metal contaminant. The secondary battery production method that comprises the deactivation process and self-discharge test can be carried out in shorter time and thus, the time spent for these steps can be reduced, making the method highly productive and economical. The secondary battery may include an embodiment consisting of a single secondary battery and an embodiment of a multi-cell battery in which two or more single secondary batteries are electrically connected. Accordingly, the secondary battery of this invention can be preferably used as a driving power source installed in a vehicle, such as an automobile, which demands particularly high safety and reliability. The present invention can thus also provide a vehicle 1, such as an automobile and the like comprising such a secondary battery 10 (which can be in a form of a multi-cell battery 100) as a power source for a vehicle-driving motor (electric motor). The type of vehicle 1 is not particularly limited, but may typically be a plug-in hybrid automobile, hybrid automobile, electric automobile, etc.

BRIEF DESCRIPTION OF DRAWINGS

FIG. 1(A)-(E) show schematic cross-sectional views of the separator according to some embodiments.

FIG. 2 shows a flowchart of the secondary battery production method according to an embodiment.

FIG. 3 shows a graph illustrating an example of a voltage profile in the metal contaminant deactivation step.

FIG. 4 shows an enlarged graph illustrating changes of charge current and voltage across positive and negative electrodes up to 30 minutes of elapsed time in FIG. 3.

FIG. 5(A)-(C) show schematically, in a cross-sectional view, the behavior of metal ions inside the separator according to an embodiment.

FIG. 6A illustrates schematically, in a cross-sectional view, the system that electrically connects the negative electrode and the separator's diffusion layer via an external separator terminal, according to an embodiment.

FIG. 6B shows a schematic cross-sectional view of the structure shown in FIG. 6A without the external separator terminal.

FIG. 7A illustrates schematically, in a cross-sectional view, the system that electrically connects the negative electrode and the separator's diffusion layer via a switch according to another embodiment.

FIG. 7B shows a schematic cross-sectional view of the structure shown in FIG. 7A without the switch.

FIG. 8(A)-(C) show schematically, in a cross-sectional view, the behavior of metal ions inside the separator according to another embodiment.

FIG. 9 shows a graph representing the relationship between the amount of dissolved metal contaminant after the minimal charging step and temperature according to an embodiment.

FIG. 10 shows a graph representing the relationship between the amount of dissolved metal contaminant after the minimal charging step and restraining pressure according to an embodiment.

FIG. 11 illustrates, in a perspective view, a way of restraining several secondary batteries.

FIG. 12 shows a graph representing an example of the voltage across positive and negative electrodes in the metal contaminant deactivation step.

FIG. 13 shows surface images of (A) separator and (B) negative electrode of an embodiment of the secondary battery of the present invention, observed after the deactivation process.

FIG. 14 shows surface images of (A) separator and (B) negative electrode of a secondary battery comprising a conventional separator, observed after the deactivation process.

FIG. 15 shows a graph representing the relationship between the time of deactivation process and the range (diameter) of precipitation of metal contaminant in some separators.

FIG. 16 shows a side view of a vehicle comprising the secondary battery according to an embodiment.

FIG. 17A shows a diagram illustrating a way of measuring the air resistance of a separator in the thickness direction.

FIG. 17B shows a diagram illustrating how a specimen is placed in measuring the air resistance of a separator in an in-plane direction.

FIG. 18A shows a graph representing an example of a voltage profile in a conventional metal contaminant deactivation process.

FIG. 18B shows a graph representing another example of a voltage profile in a conventional metal contaminant deactivation process.

DESCRIPTION OF EMBODIMENTS

The present invention is described more in detail below. Matters necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field.

In this description, the term "secondary battery" refers to a general rechargeable battery that is mediated by migration of charge carries, typically including a nickel-hydrogen battery, lithium secondary battery, lithium polymer battery, lithium-ion capacitor and the like.

The present inventors have earnestly researched dissolution profiles of inevitable metal contaminants mixed in during production of secondary batteries. For instance, in a metal contaminant deactivation technique as disclosed in Patent Document 1, a battery is initially charged to 0.01% to 0.1% of its capacity and left standing for at least 1 hour up to 48 hours. As exemplified in FIG. 18A, such a technique has been found to cause a decrease in positive electrode potential while the battery is standing after charged. Thus, it has become evident that there are cases where due to a decreased dissolution rate of metal contaminant, longer time (e.g. 48 hours or more) is required to sufficiently dissolve the metal contaminant. It has been also found that, for instance, as shown in FIG. 18B, the extent of decrease in positive electrode potential can vary while standing after charged. Such effects may arise, even when batteries are manufactured to the same specifications, because of lot-to-lot variation of electrode materials, etc. Thus, the time required for deactivation of a metal contaminant could vary, requiring, on the safe side, a longer time setting for the process to more reliably deactivate the metal contaminant. In addition, the tendency for an initial negative electrode potential lower than the redox potential of a metal contaminant has been found significant, for instance, in a battery using an electrode material having a relatively low capacity retention rate, such as a lithium transition metal composite oxide of a ternary type (three-transition-metal) type, etc.

It has been observed that minute changes in cell configurations can greatly affect the dissolution behavior of a metal contaminant and have an impact on the voltage profile during deactivation of the metal contaminant. In addition to the type of electrode and lot-to-lot variation, factors affecting the voltage profile include, for instance, design differences such as variation of the additive concentration in the electrolyte, etc., as well as unintentional variation such as effects of storage conditions for electrodes and so on.

Under such circumstances, the present inventors have found the following and conceived of the present invention: (1) In a metal contaminant deactivation process, by minimizing and controlling effects on the voltage profile to constantly ensure an optimal voltage, the dissolution behavior of metal contaminant can be stabilized and the time required for deactivation can be reduced. (2) The effect of the deactivation process can be further increased by performing the process in combination with a secondary battery configuration that allows more effective diffusion of dissolved metal ions.

The present invention thus provides a method for producing a secondary battery comprising a positive electrode, a negative electrode and a separator placed between the positive electrode and negative electrode. Such a secondary battery is constructed by assembling the positive electrode, separator and negative electrode in a cell constructing step, placing them along with a non-aqueous electrolyte in a battery case, and sealing the battery case. In assembling the secondary battery, for instance, the positive electrode (e.g. a positive electrode active material layer formed on a positive current collector) may happen to include a metal contaminant such as copper, iron, etc. from a sliding member and the like of production equipment. If the positive electrode includes a metal contaminant even as minute as, for instance, about 50 μm, and if the positive electrode potential increases above the dissolution potential of the metal contaminant during charging, the metal contaminant dissolves to form metal ions. Usually, between the positive and negative electrodes (typically inside the separator), the metal ions linearly move toward the negative electrode. Thus, when the charging is continued, the metal ions would reach the negative electrode and precipitate out locally at the corresponding opposite location on the negative electrode. With the progress of the charge, the precipitates on the negative electrode would grow gradually toward the positive electrode side.

The present invention is characterized in that to inhibit such precipitate growth, prior to initial conditioning charging, the constructed secondary battery is subjected to a metal contaminant deactivation process comprising a minimal charging step described below. Such a technique can be more effective when iron (Fe)—which is relatively highly resistant and poorly soluble (requires time to dissolve) in the electrolyte—is expected as a primary metal contaminant that needs to be dissolved, and the iron (Fe) is deactivated. The present invention also provides a secondary battery in an embodiment suited to such a deactivation process as well as a secondary battery which has been subjected to such a deactivation process to be sufficiently less susceptible to a short circuit caused by a metal contaminant.

First Embodiment

A secondary battery configuration suited to such a deactivation process is described first. The secondary battery provided by this invention comprises a positive electrode, a negative electrode, and a separator placed between the positive electrode and negative electrode. The separator is characterized by having an air resistance Rp of 100 sec or less in an in-plane direction vertical to its thickness direction and an air resistance Rt in the thickness direction higher than the air resistance Rp in the in-plane direction. Such a structure facilitates diffusion of metal ions in in-plane directions of the separator.

To allow migration of charge carriers between the positive electrode and negative electrode, a known porous resin separator has a microporous structure comprising many pores that connect the positive electrode and negative electrode. While it varies depending on the structure, material, etc., a known porous resin separator generally has an air resistance of about 10 sec to 800 sec (typically about 100 sec to 800 sec) in the thickness direction. Such a known separator is typically produced by a pore-forming stretch method or by a phase separation method, etc. Each of these production methods includes a stretching step and thus brings about a structure that is permeable to charge carriers in the thickness direction, but poorly permeable in in-plane directions vertical to the thickness direction. In other words, practically, with respect to a known separator, the air resistance Rp in an in-plane direction is smaller than the air resistance Rt in the thickness direction.

On the contrary, with respect to the secondary battery disclosed herein, as described above, the air resistance Rp in the in-plane direction of the separator is defined to be lower than the air resistance in the thickness direction while being at or below 100 sec. An air resistance Rp of 100 sec or less allows metal ions dissolved out from a metal contaminant to diffuse more uniformly in an electrolyte solution in a certain time period (e.g. 24 hours, preferably 20 hours). For more effective diffusion of metal ions, the air resistance Rp is more preferably 80 sec or less, or even 50 sec or less, for instance, preferably 30 sec or less. The air resistance Rt in the thickness direction is not particularly limited. However, if the air resistance Rp in the in-plane direction is as low as indicated above, and if the air resistance Rt in the thickness direction is also lowered, the separator itself may not have sufficient mechanical strength. Thus, the air resistance Rt in the thickness direction should be higher than the air resistance Rp in the in-plane direction can be preferably selected in a range above 100 sec up to 700 sec. According to such a structure, the separator can facilitate diffusion of metal ions without sacrificing the mechanical strength.

In this description, air resistance refers to a value measured based on the air resistance test method (Gurley method) specified in JIS P 8117:2009. FIG. 17A shows a cross-sectional view of the structure of a Gurley air resistance tester 200. Air resistance can be obtained as the time (sec) for a given volume of air to pass through a specimen of a given surface area, from its one face to the other face in the thickness direction, under a specified pressure difference. In this invention, the air resistance Rt of the separator in its thickness direction can be obtained as the time (sec) required for 100 mL of air to pass through a specimen (separator) 202 of a given surface area (typically a surface area S of a circle having a permeable plane of 28 mm in diameter), with the specimen being clamped with a fastener to an upper segment of an inner cylinder 206 of a given weight.

Separators are often too thin in thickness to be measured for air resistance Rp in in-plane directions with a conventional air resistance tester. Thus, in particular, when measuring air resistance of a separator in an in-plane direction, for instance, a test specimen 202A can be obtained by using a fastener 204A and an attachment 204B as shown in FIG. 17B. Herein, specimen 202A is formed of several (n number of) sheets of the separator of a thickness t layered and fastened to a specimen width corresponding to a given permeable plane diameter d with fastener 204A. The thickness T (equivalent to the width of individual separator sheet) of specimen 202A may be arranged in accordance with the thickness of fastener 204A. The specimen 202A is fastened via attachment 204B to an inner cylinder 206A. Then, an air resistance X is measured in the same manner as the air resistance Rt in the thickness direction. The air resistance X thus obtained can be corrected in accordance with the construction of specimen 202A to determine the air resistance Rp in the in-plane direction relative to the air resistance Rt in the thickness direction. For instance, based on equations (1) and (2) below, air resistance Rp can be obtained by converting air resistance X to the time required for 100 mL of air to pass through specimen 202A of a thickness t and a given surface area (typically, a surface area S of a circle having a permeable plane of 28.6 mm in diameter).

$$d = t \times n \quad (1)$$

$$Rp = X \times t/T \times S/(\pi d^2/4) \quad (2)$$

To prepare specimen 202A, the thickness t of the separator can be adjusted to the actual separator thickness in the battery, for instance, by controlling the restraining pressure exerted by measurement jig 204A.

The in-plane direction can be any in-plane direction vertical to the thickness direction, not limited to any particular direction (e.g. the width direction, length direction, etc.) in the plane. It is preferable that fastener 204A, attachment 204B and inner cylinder 206A have material compositions, dimensions, shapes, etc., adjusted to yield a prescribed total weight.

It is needless to say that the method for measuring the separator's air resistance Rp in an in-plane direction is not limited to the example above as long as the air resistance Rp in the in-plane direction can be determined relative to the air resistance Rt in the thickness direction.

FIG. 1(A)-(E) illustrate schematically, in cross-sectional views, examples of separator structures usable in the secondary battery of the present invention. The separator is not limited to any specific structure as long as it has an overall structure capable of insulating the positive electrode and negative electrode and exhibiting an air resistance Rp in an in-plane direction lower than the air resistance in the thickness direction. For instance, as illustrated in FIG. 1(A)-(E), it can be formed of one layer or of two or more layers. As long as insulation is obtained between the positive electrode and negative electrode in the conditions of use of the battery, the separator may be formed of an insulating material alone or of an insulating material and a conductive material in combination. As the insulating material, various inorganic materials, organic materials that exhibit a desirable level of insulation (i.e. not having a desirable level of conductivity) as well as composite materials of these can be used. As the conductive material, various metallic materials, inorganic materials and organic materials that have a desirable level of conductivity as well as composite materials of these can be used.

More specifically, FIG. 1(A)-(C) illustrate separators, each consisting of a single layer.

For instance, (A) is a separator formed of many flaky separator parts joined together so that their planes are oriented in in-plane directions of the separator. The separator parts can be crystalline particles, polymer particles, and so on in forms of scales, flakes and the like. These separator parts may be joined together with a binder or directly joined with one another without a binder. According to such a structure, the air resistance Rp in an in-plane direction vertical to the thickness direction can be less than 100 sec while the air resistance Rp in the in-plane direction is smaller than the air resistance in the thickness direction.

For example, FIGS. 1(B) and (C) show separators in which the air resistance in an in-plane direction has been successively changed in the thickness direction. For instance, in the separator in (B), viewing in the thickness direction, the air resistance in in-plane directions is low at the top in the drawing and gradually increases toward the bottom in the drawing. As a whole, the air resistance Rp in in-plane directions has been adjusted to 100 sec or less. In the separator in (C), viewing in the thickness direction, the air resistance in in-plane directions is high at the top and bottom in the drawing and gradually decreases toward the center. As a whole, the air resistance Rp in in-plane directions has been adjusted to 100 sec or less. These separators are constituted so that, as a whole, the air resistance Rt in the thickness direction is higher than the air resistance Rp in in-plane directions.

For instance, in producing the separator by a method for manufacturing non-woven fabrics or for applying a fibrous material, air resistance can be adjusted by making fabric with varying the thickness and density of the fiber. Specifically, for instance, in (B), the fiber thickness and density have been adjusted to increase from the top to the bottom in the drawing in the thickness direction of the separator. In (C), the fiber thickness and density have been adjusted to decrease once and then increase from the top to the bottom in the drawing in the thickness direction. In both (B) and (C), there are portions where the fiber thickness and density have been adjusted larger. Due to such structures, the air resistance Rt in the thickness direction is higher than the air resistance Rp in an in-plane direction. The means for adjusting the fiber thickness and density are not limited to these examples and various embodiments can be considered.

FIGS. 1(D) and (E) illustrate, for instance, separators, each being formed of a laminate of two or more layers. In these separators, the air resistance in an in-plane direction has been changed stepwise in the thickness direction. (D) shows an example of a separator having a two-layer structure. For instance, the upper layer in the thickness direction in the drawing is formed to have a relatively low air resistance in the thickness direction while the air resistance in an in-plane direction is high enough when compared to the thickness direction. The lower layer in the thickness direction of the drawing has a sufficiently low air resistance in an in-plane direction. As a whole, the separator has been adjusted to have an air resistance Rp of 100 sec or less in an in-plane direction. Such a structure can be obtained, for instance, by forming the upper layer in the thickness direction of the drawing with a layer formed of a known microporous resin while forming the lower layer with a diffusion layer having an air resistance Rp in an in-plane direction of, for example, less than 100 sec (e.g. 80 sec or less).

On the other hand, (E) shows an example of a separator having a three-layer structure. For instance, with respect to the upper and lower layers in the thickness direction of the drawing, while the air resistance in the thickness direction is not high, the air resistance in an in-plane direction is sufficiently high as compared with that in the thickness direction. With respect to the middle layer in the thickness direction of the drawing, the air resistance in an in-pane direction is sufficiently low. For the separator as a whole, the air resistance Rp in an in-plane direction has been adjusted to be lower than the air resistance Rt in the thickness direction while being at or below 100 sec. Such a structure can be obtained, for instance, by forming each of the upper and lower layers in the thickness direction of the drawing with a layer formed of a known microporous resin while forming the middle layer with a diffusion layer having an air resistance Rp in an in-plane direction of, for example, less than 100 sec (e.g. 80 sec or less).

The diffusion layer can have various structures that have an air resistance Rp of less than 100 sec in an in-plane direction and are able to yield a separator having, as a whole, an air resistance Rp of 100 sec or less in an in-plane direction. Specific examples of such a constitution include a porous body, non-woven fabric, woven fabric, and the like.

The porous body can be formed of, for instance, various porous materials comprising successive pores in such a form that several pores are joined together three-dimensionally. Such successive pores may be formed as inter-particle voids with several particles (which can be spherical, fibrous, stick-like, flat, etc.) joined partially and superficially, or can be formed with several pores that had been integrated into the porous body and linked together. The several particles can be joined to one another directly or with a binder, for instance. Such a porous body can be formed from one species or a combination (a mixture or composite material) of two or more species among resin materials such as polyethylene, polypropylene, polyimide, polyamide, etc.; inorganic materials such as glass, ceramic, inorganic carbon materials, etc.; and metallic materials such as copper, steel, etc. In view of ensuring the strength of the separator with low air resistance in an in-plane direction, for instance, it is preferable to use a sheet formed of a porous metal (porous metal body), sintered SUS (Stainless Steel specified by JIS) fiber filter and the like as the porous body.

The non-woven fabric can be various materials obtainable by uniting long fibers together into a sheet without weaving. The separator can be a sheet formed of long fibers tangled and united, but not bonded; long fibers directly attached together at intersections; or long fibers bonded together with a binder at intersections. For instance, the long fibers can be formed of one species or a combination (a mixture or composite material) of two or more species among resin materials such as polyethylene, polypropylene, polyimide, polyamide, etc.; inorganic materials such as glass, ceramics, inorganic carbon materials, etc.; and metallic materials such as copper, steel, etc. In view of ensuring the strength of the separator with low air resistance in an in-plane direction, for instance, it is preferable to use a non-woven fabric formed of fibers bonded together with a binder or the like, with examples of the fibers including conductive fibers such as carbon nanotubes, whiskers, etc.; and ceramic fibers made of silica, alumina, aluminosilicate, etc.

The woven fabric can be various materials obtainable by weaving long fibers into a sheet (cloth). The textile structure of the woven fabric is not particularly limited. Examples include various structures such as plain weaves, twill weaves, sateen weaves, etc. The fiber diameter and the opening size (mesh) can be selected at will as well. In particular, a fabric woven in a way that a strand bends greatly (i.e. create a bulk) in the thickness direction is preferable since it can have a low air resistance in an in-plane direction. For instance, a more preferable woven fabric has a thickness about 2.5 to 3.5 times the thread thickness. Such long fibers can be formed from one species or a combination (a mixture or composite material) of two or more species among resin materials such as polyethylene, polypropylene, polyimide, polyamide, etc.; inorganic materials such as glass, ceramics, inorganic carbon materials, etc.; and metallic materials such as copper, steel, etc. In view of ensuring the strength of the separator with low air resistance in an in-plane direction, for instance, it is preferable to use a plain weave superfine metal wire mesh of a suitable opening size. For instance, metal meshes formed of superfine strands of various SUS materials can be preferably used.

The diffusion layer discussed above can be formed of either a conductive material or an insulating material. The conductive material can be various metallic material(s), conductive glass material(s), conductive polymeric material(s), conductive oxide(s), conductive carbon material(s) and the like. The insulating material can be various (insulating) glass materials, (insulating) polymeric materials, (insulating) oxides, and the like. In this invention, if a metallic material is used as a component of the separator and if the portion formed of the metallic material in the separator is always insulated from the positive electrode and negative electrode, the metallic material is not particularly limited material-wise, and any metallic material including an alloy can be used. On the other hand, if the portion formed of a metallic material in the separator can be connected to at least either the positive electrode or negative electrode (typically to the negative electrode), to avoid corrosion associated with charging and discharging, the metallic material is preferably formed of a metal (including an alloy; the same applies hereinafter) having a higher redox potential than a metal considered as a metal contaminant. For instance, when iron (Fe) is considered as a metal contaminant, the metallic material used as a separator component (diffusion layer) is preferably a metal having a higher redox potential than iron (Fe). Specific examples of a typical element having a higher redox potential than iron (Fe) include gold (Au), platinum (Pt), iridium (Ir), palladium (Pd), silver (Ag), copper (Cu), bismuth (Bi), antimony (Sb), lead (Pb), tin (Sn), nickel (Ni), cobalt (Co) and cadmium (Cd). As for a material formed of a metal having a redox potential seemingly equal to or below that of iron (Fe), if the metal can form an anti-corrosion coating (passivation film) on the surface to resist corrosion, it can be preferably used as the metallic material in this invention. Typical examples of a metal capable of forming such passivation film include iron (Fe), aluminum (Al), titanium (Ti), chromium (Cr), and an alloy of these. For instance, it can be a stainless steel. In the following, unless otherwise noted, the metallic material used as a component of the separator is described in reference to an example wherein the metallic material portion is unsusceptible to corrosion when connected to at least either the positive electrode or negative electrode (typically to the negative electrode).

A preferable example of the diffusion layer described above can have an air resistance Rp of 80 sec or less (e.g. 50 sec or less) in an in-plane direction. In view of ensuring the strength required of the separator, a metallic material of low elasticity is preferable among the examples listed above. A material of low elasticity can be selected and used among various materials having an elastic modulus of, for instance, 30 or greater.

FIG. 1(A)-(C) schematically illustrate structures of the separator, but do not accurately reflect actual structures of the separator. For example, the combination of a porous resin layer and a diffusion layer, the thickness ratio of the respective layers, the size distribution of the porous material, etc. are not limited to the examples described above, and can be suitably selected. The overall thickness of the separator is not particularly limited and can be suitably selected. It can be, for instance, 10 µm or larger, but 50 µm or smaller, typically 10 µm or larger, but 40 µm or smaller. In these embodiments, the diffusion layer may have a thickness of, for instance, about 20 µm or larger, but 30 µm or smaller.

For example, the positive electrode and negative electrode can be layered via a separator having a constitution as described above to construct a cell.

It is noted that Patent Document 4 discloses a separator of uneven porosity in the thickness direction. In such a separator, while ion permeability is retained in the thickness direction, the separator strength can be increased. However, no discussion is included of the ion permeability in an in-plane direction vertical to the thickness direction, and it is thus distinct from the separator in the present invention.

Patent Document 5 discloses a battery separator formed of a polyolefin and a porous ceramic sheet in which ceramic fibers are attached to one another at the intersections. In such a battery separator, the ceramic sheet is impregnated with the polyolefin, or the ceramic sheet and polyolefin sheet are pressed and joined together almost to the thickness of the ceramic sheet. Accordingly, the air resistance is extremely low in in-plane directions vertical to the thickness direction, and it can be clearly distinguished from the separator disclosed herein.

FIG. 2 shows a flowchart illustrating an embodiment of the secondary battery production method disclosed herein. As illustrated in FIG. 2, the method of the present invention is characterized by comprising the following steps (S10) to (S40):

(S10) a step of constructing a cell comprising a positive electrode, a negative electrode, and a separator having an air resistance Rp of 100 sec or less in an in-plane direction vertical to its thickness direction and an air resistance Rt in the thickness direction higher than the air resistance Rp in the in-plane direction;

(S20) a step of placing the cell constructed in the step (S10) in a battery case;

(S30) a minimal charging step comprising charging the cell (battery) to 0.01% to 0.5% of the cell capacity over at least one hour to obtain a state of charge where the positive electrode has a potential equal to or above the oxidation potential of a probable metal contaminant while the negative electrode has a potential equal to or above the reduction potential of the probable metal contaminant, followed by maintaining the state of charge; and (S40) a step of performing initial conditioning charging.

FIG. 3 shows the voltage profile of a lithium secondary battery during the minimal charging step (S30) in an embodiment. The curves in the graph indicate temporal changes in positive electrode potential, negative electrode potential, difference between positive and negative electrode potentials (or interelectrode voltage (voltage across positive and negative electrodes), hereinafter) and amount of current supplied.

In the present invention, for instance, as shown in FIG. 2, the minimal charging step (S30) is performed as a metal contaminant deactivation process. The minimal charging step (S30) can be performed on a secondary battery obtained by constructing a cell in the cell constructing step (S10) and placing the cell into a battery case (S20) (i.e. a secondary battery immediately after the construction prior to any charging). Alternatively, after the step (S20) of placing the cell into the battery case, via a step (S25) of constructing a multi-cell battery by electrically connecting several secondary batteries obtained, the minimal charging step (S30) can be performed on the multi-cell battery formed of the several secondary batteries. The cell constructing step (S10) and the step (S20) of placing the cell in a battery case can be carried out based on known techniques, using the characteristic separator.

In the minimal charging step (S30), for instance, as illustrated in the temporal changes in the positive electrode potential and negative electrode potential in FIG. 3, the charging is conducted to a state of charge where the positive electrode potential is equal to or above the oxidation potential of a probable metal contaminant and the negative electrode potential is equal to or above the reduction potential of the probable metal contaminant, relative to a lithium (Li) metal reference electrode; and the resulting state of charge is maintained.

Among metal contaminants possibly mixed in during the manufacture of secondary batteries, the metal contaminant to be deactivated in the production method of the present invention can be a soluble (ionizable) metal that has a redox potential within the range of operating voltage of the secondary battery. Thus, for the metal contaminant, it is unnecessary to consider a metallic foreign substance that is unlikely to dissolve (forms ions) in the operating voltage range of the secondary battery even if it is expected to be mixed into the positive electrode, etc. In general, examples of such a metal contaminant include iron (Fe), copper (Cu), tin (Sn), zinc (Zn) and an alloy of these.

The positive electrode potential is equal to or above the oxidation potential of the expected metal contaminant. For instance, when copper (Cu) is mixed in as a metal contaminant, it can be deactivated if the positive electrode potential is higher than the oxidation potential of copper (Cu). If the positive electrode potential is higher than the oxidation potential of copper (Cu), and if copper (Cu) is present at the positive electrode, the copper dissolves and the dissolved copper (i.e. Cu ions) migrates toward the negative electrode. The negative electrode potential is also equal to or above the reduction potential of copper (Cu). Thus, after reaching the negative electrode, the Cu ions may remain in the electrolyte without getting reduced. With increasing storage time at such a voltage level, the diffusion in the electrolyte proceeds in a direction that yields an increasingly uniform Cu ion concentration. After the Cu ions are sufficiently diffused in the electrolyte, by dissipating the difference between the positive and negative electrode potentials, the Cu ions precipitate out, reflecting the diffused state in the electrolyte. Such Cu precipitation may be sufficiently diffuse and thus will not cause a short circuit, whereby the copper (Cu) becomes deactivated as a metal contaminant.

A case where copper (Cu) is expected as a metal contaminant has been described above. However, for instance, deactivation can be achieved actively and reliably even for a case where an expected metal contaminant is iron (Fe) which dissolves slowly due to its higher resistance. It is noted that even when iron (Fe) is expected as a metal contaminant, for instance, since the positive electrode potential is higher enough than the redox potential of iron (Fe), dissolution of iron (Fe) can be preferably facilitated further. For instance, when the positive electrode potential is equal to or above the redox potential of copper (Cu), both copper (Cu) and iron (Fe) can be deactivated.

FIG. 3 illustrates, for instance, the voltage profile of a secondary battery in the minimal charging step with respect to a case where iron (Fe) is expected as a metal contaminant. The method of the present invention is thus described in detail in reference to an example where iron (Fe) is expected as a metal contaminant.

A state of charge profile as illustrated in FIG. 3 appears when the positive electrode potential is always controlled at or above the oxidation potential of iron (Fe) while the negative electrode potential is controlled not to decrease below the reduction potential of iron (Fe). In other words, at all times, the positive electrode is in a state that allows reliable dissolution of iron (Fe) and a metal species having a lower oxidation potential (dissolution potential) than iron and the negative electrode is in a state that prevents the dissolved metal species from precipitating out. Thus, in the minimal charging step (S30), iron (Fe) and a metal species having a lower dissolution potential than iron are expected as metal species that reliably dissolve out at the positive electrode. In this embodiment, the oxidation potential of iron (Fe) is around 2.5 V (vs. $Li/Li^+$). However, the oxidation potential of iron (Fe) is not necessarily limited to this value and can be selected based on the actual oxidation potential of iron (Fe) in a cell of interest.

The charging must be carried out at a slow charging rate to provide a charge up to 0.01% to 0.5% of the cell capacity over one hour or more. In general, after impregnated with an electrolyte, the positive and negative electrode potentials are, for instance, more or less around 3.0 V (vs. Li/Li$^+$). Initial charging at a rapid or typical charging rate (e.g. charging to 0.01% to 0.5% of cell capacity in 10 minutes or less) may bring drastic changes in positive and negative electrode potentials. In the invention disclosed herein, by charging at such a slow rate, the positive and negative electrode potentials can be prevented from changing drastically and maintained constantly at or above the reduction potential of iron (Fe). Thus, iron (Fe) will not precipitate out on the negative electrode.

FIG. 4 shows an enlarged graph illustrating changes of charge current and interelectrode voltage up to 30 minutes of elapsed time. Charging at such a slow rate will even prevent changes in the interelectrode voltage that are likely to appear in an initial charging period and allow more highly precise adjustment and control of the potentials, such as in FIG. 3.

Specifically, in the secondary battery under such conditions, a metal contaminant is deactivated, for instance, as shown in FIG. 5(A)-(C). In FIG. 5(A), when the potential of a positive electrode 20 increases to or above the redox potential in the minimal charging step (S30), a metal contaminant 25 present on the surface of positive electrode 20 starts to dissolve into the electrolyte solution to form metal ions 27 as illustrated in FIG. 5(B). A separator 40 in the secondary battery has a lower air resistance Rp in an in-plane direction than in the thickness direction, and the air resistance Rp is 100 sec or less. In the minimal charging step (S30) as described above, the charging is performed at an extremely low rate over one hour or more, and the potential of a negative electrode 30 is also kept at or above the reduction potential of iron (Fe). Thus, in the minimal charging step (S30), the dissolved metal ions can stay somewhere between positive electrode 20 and negative electrode 30, that is, in the separator 40. Their diffusion is facilitated in in-plane directions in separator 40. Thus, they can be diffused almost uniformly over a wide range of the electrolyte solution inside the separator 40. Subsequently, for instance, in the next initial conditioning charging step (S40), when a potential difference is induced between the positive and negative electrodes and the potential of negative electrode 30 decreases below the reduction potential of iron (Fe), the metal ions diffused almost uniformly in the electrolyte solution are attracted all at once to the negative electrode 30 and precipitate out on the surface thereof. Instead of accumulating locally in a surface region of negative electrode 30 opposite the original location of metal contaminant 25 on the surface of positive electrode 20, metal ions 27 precipitate out in a sufficiently diffused state on the surface of negative electrode 30 as illustrated in (C). According to such a structure, diffusion of metal ions 27 is sufficiently facilitated in the minimal charging step, whereby deactivation can be completed in less time. For instance, even when the metal contaminant 25 is relatively large, such as about 50 μm in diameter which is large enough to cause a short circuit, the metal contaminant 25 can be precipitated in a sufficiently diffused state on the negative electrode, thereby preventing precipitates 35 from causing a minor short circuit. By any chance if the secondary battery is put in use with some metal contaminant 25 is still present (remaining) on positive electrode 20, some metal ions 27 dissolved from positive electrode 20 can be diffused in the separator 40. Thus, localized precipitation on the surface of negative electrode 30 can be reduced.

The charging to the state of charge described above is preferably carried out by constant-current, constant-voltage (CC-CV) charging. CC-CV charging allows more precise voltage control. It is noted that, for instance, when CC charging to a 0.01% cell capacity in one hour, the current is equivalent to 0.01 C. In the minimal charging step disclosed herein, it is desirable to perform the charging even more slowly. Thus, it is preferable that the CC charge current is 0.01 C or less, for instance, 0.008 C or less, or more strictly 0.005 C or less.

The CV charge voltage across positive and negative electrodes is preferably 0.5 V or higher, but 1.3 V or lower. Deactivation is possible even if the interelectrode voltage is below 0.5 V. However, when the interelectrode voltage is below 0.5 V, it unfavorably requires more time than necessary to dissolve the metal contaminant. Thus, from the standpoint of increasing the dissolution rate of metal contaminant at the positive electrode to reduce the time required for the deactivation process, the interelectrode voltage is preferably 0.5 V or higher. Deactivation is possible even if the interelectrode voltage is above 1.3 V. However, to obtain an interelectrode voltage exceeding 1.3 V, more precise control of positive and negative electrode potentials is required. It will unfavorably increase the likelihood of the positive electrode potential increasing to or above the oxidation potential of copper (Cu) or, conversely, the likelihood of the negative electrode potential decreasing to or below the reduction potential of iron (Fe), causing precipitation of either copper (Cu) or iron (Fe) on the negative electrode. According to studies by the present inventors, while it is conditional on various factors, in the minimal charging step, when the interelectrode voltage begins to increase above 1.3 V, there may be observed, for instance, iron (Fe) precipitation on the negative electrode. Based on these, to carry out the deactivation process more stably in short time, the interelectrode voltage is suitably 0.5 V or higher, but 1.3 V or lower, for instance, 0.6 V or higher, but 1.0 V or lower, preferably 0.7 V or higher, but 0.9 V or lower, or more definitively about 0.8±0.05 V.

During CV charging in the minimal charging step, the potential difference between the negative electrode and battery case (which may be an outer can) is preferably −0.5 V or greater, but 0.2 V or less. Such a potential difference range is prescribed based on the precipitation potentials of aluminum (Al) in some electrolytes. In general, in a secondary battery, the outer can is formed of a metal, typically aluminum or an aluminum alloy. The outer can will have a certain potential against the positive and negative electrodes on contact with the electrolyte inside the battery during the deactivation process. The voltage of the outer can be measured relative to the positive electrode and to the negative electrode, separately. Thus, while the interelectrode voltage is prescribed as above, the voltage across the outer can and negative electrode is also measured so as to maintain the negative electrode potential at or above the precipitation potential of any aluminum or aluminum alloy dissolved from the outer can. Such voltage setting across the negative electrode and outer can allows preventing a metal contaminant, such as aluminum or an aluminum alloy, etc., dissolved from the outer can, from precipitating out on the negative electrode. With such a configuration, a safer, higher-quality secondary battery can be produced.

The state of charge in the minimal charging step can be maintained for a time period by which the metal contaminant to be deactivated is considered sufficiently dissolved and diffused. The time period to maintain such a state of charge can be preferably selected mainly in view of, for instance, (1) the size of metal contaminant that comprises a relatively slow-dissolving metal (typically iron (Fe)); (2) the secondary battery configuration; (3) the interelectrode voltage; (4) the target time period spent for the entire process; and so on. In the method disclosed herein, the state of charge is maintained for 5 hours or more, but 24 hours or less, typically for 5 hours or more, but 20 hours or less. For instance, when the minimal charging step is performed at an environment temperature of 25° C. at an interelectrode voltage of 0.8 V, it will take 10 hours or less to completely dissolve an iron (Fe) particle of 200 μm in diameter and 10 μm in thickness. Accordingly, deactivation of most metal contaminants can be considered complete in the time period including the 10 hour period, that is, in 5 hours (half the 10 hours) or more, but 20 hours (twice the 10 hours) or less.

In such a minimal charging step, metal contaminant 25 mixed in the cell dissolves and diffuses into the electrolyte as metal ions 27. As illustrated in FIG. 5(C), when the potential of negative electrode 30 decreases in the subsequent initial conditioning charging step (S40), ions 27 of metal contaminant 25 in a sufficiently diffused state in the cell precipitate out very thinly over a wide range (preferably almost over the entire surface) of negative electrode 30. In other words, ions 27 of metal contaminant 25 diffuse first and then reach negative electrode 30, and thus are inhibited from locally precipitating in a given area on negative electrode 30. Since such precipitates 35 cannot cause a short circuit, the metal contaminant 25 mixed in the cell is considered deactivated.

As illustrated in the present embodiment, when the diffusion layer and negative electrode are not electrically connected, it may be preferable, in view of the cost, separator design, etc., to form the separator's diffusion layer with an insulating material.

Specifics of the charging process, etc., in the initial conditioning charging step are not particularly limited. The charging, etc., can be carried out under various conditions that can increase the performance of the subject secondary battery. For instance, the battery can be subjected to repeated cycles of charging to a suitable charge level followed by a standing break for a prescribed time period followed by discharging to a prescribed voltage. In such an initial conditioning charging step, the secondary battery is charged to a prescribed battery capacity.

After the initial conditioning charging step, the production method disclosed herein may further include a self-discharge test step. In such a self-discharge test step, the cell charged by the initial conditioning is subjected to a measurement of voltage drop to determine the presence of an internal short circuit. The type of short circuit subject to the test is a minor short circuit caused by localized precipitation of some metal contaminant remaining on the positive electrode side. Thus, conventionally, accurate detection of the presence of such a minor short circuit would require at least about five days or even about ten days in some cases. This is mainly because the test time would be set up based on presumptions that highly resistant, slow-dissolving ion (Fe) is residually present as a metal contaminant in a cell and causes an internal short circuit, and detection of this takes 5 days or more.

On the contrary, in the production method disclosed herein, slow-dissolving iron (Fe) is reliably dissolved in the minimal charging step and then thinly precipitated out in a diffused state on the negative electrode in the subsequent initial conditioning step. Thus, the possibility of an internal short circuit caused by iron (Fe) can be disregarded in the self-discharge test. Accordingly, the self-discharge test step should detect just the presence of an internal short circuit caused by, for instance, a metal other than iron (Fe). While it depends also on the type and size of the probable metal contaminant, the test can only take, for instance, at most 24 hours, more definitively at most 15 hours, for instance, at most 12 hours, more preferably at most 10 hours, or even about 2 to 5 hours. By this, the time required for the self-discharge test step can be significantly reduced, notably increasing the productivity.

With respect to copper (Cu), due to its small resistance, the presence of a short circuit can be tested by about a few hours (e.g. one to two hours) of self-discharge test step. For instance, when the self-discharge test step is carried out for more than a few hours, copper (Cu) can be excluded from probable metal contaminants in the minimal charging step disclosed herein.

Second Embodiment

In the secondary battery production method as described above, for the minimal charging step, it is also preferable to carry out the charging while the separator's diffusion layer and negative electrode are electrically connected.

In the secondary battery in such an embodiment, the separator's diffusion layer is formed from a conductive material, and there is included a system capable of electrically connecting the diffusion layer and negative electrode.

The system capable of electrically connecting the diffusion layer and negative electrode is a system that can electrically connect or insulate the diffusion layer and negative electrode at a given instance. In the present invention, it should be able to electrically connect the diffusion layer and negative electrode at least once and then insulate (disconnect) them. In general, the separator components are insulated from the positive electrode and/or negative electrode. In the present invention, however, the diffusion layer as a separator component can be electrically connected to the negative electrode at an arbitrary timing.

Such a configuration can be obtained, for instance, by providing an external separator terminal to the battery case. Specifically, for instance, as shown in FIG. 6A, to a battery case 80 containing positive electrode 20, negative electrode 30 and separator 40, an external separator terminal 70 is provided along with an external positive terminal 50 and an external negative terminal 60. A diffusion layer 42 of separator 40 is electrically connected via a conductive member (typically, a lead, tab, etc.) 44 to external separator terminal 70. For instance, in an wound electrode assembly constituted with positive electrode 20, negative electrode 30 and two sheets of separator 40, the two sheets of separator 40 are arranged beforehand so that their ends are at least partially longer than positive electrode 20 and negative electrode 30 at the winding end. Diffusion layer 42 of separator 40 and external separator terminal 70 can be connected via conductive member 44 at the winding end. In FIG. 6A, for convenience, only one sheet of separator 40 seems to be used. However, the two sheets of separator 40 are connected at the winding end to conductive member 44 and connected via the conductive member 44 to external separator terminal 70. It can be also configured with only one sheet of separator 40 being connected via conductive member 44 to external separator terminal 70.

According to such a configuration, for instance, in the minimal charging step, when a voltage is applied across external positive terminal 50 and external negative terminal 60, through connection between external negative terminal 60 and external separator terminal 70 outside the battery case 80, negative electrode 30 and diffusion layer 42 can be electrically connected. Such a connection can be made at an arbitrary timing for an arbitrary time period and thereby allows negative electrode 30 and diffusion layer 42 to be at the same potential, for instance, only during the minimal charging step. External separator terminal 70 is unnecessary for the use of the battery, and thus can be removed or disabled after the minimal charging process. For instance, as illustrated in FIG. 6B, external separator terminal 70 can be removed from battery case 80, and another member can be attached instead, such as a safety valve 90, lid, etc.

Alternatively, in an embodiment, without external separator terminal 70 on the outside of battery case 80, negative electrode 30 and diffusion layer 42 of separator 40 may be electrically connected in advance inside the battery case 80 and disconnected after the minimal charging step. Specifically, for instance, as shown in FIG. 7A, via a simple switch 75 provided to battery case 80, negative electrode 30 and diffusion layer 42 of separator 40 are electrically connected. After the minimal charging step is complete, switch 75 is turned off (not shown in the drawing) to insulate negative electrode 30 and diffusion layer 42. Such a connection can be made at an arbitrary timing for an arbitrary time period and thereby allows negative electrode 30 and diffusion layer 42 to be at the same potential, for instance, only during the minimal charging step. The switch 75 can be also removed, for instance, at an arbitrary timing after the completion of the minimal charging step, and the mounting hole can be sealed. The mounting hole can be sealed, for instance, as shown in FIG. 7B, by attaching another member such as safety valve 90, lid, etc.

In the secondary battery in such a state, for instance, as shown in FIG. 8(A)-(C), metal contaminant 25 is deactivated. In FIG. 8(A), metal contaminant 25 may be mixed in the surface of positive electrode 20. In this case, in the minimal charging step (S30), when the potential of positive electrode 20 increases to or above the redox potential (of metal contaminant 25), with negative electrode 30 and diffusion layer 42 having the same potential, metal contaminant 25 begins to dissolve into the electrolyte solution to form metal ions 27. At this point, diffusion layer 42 of separator 40 is conductive and at the same potential as negative electrode 30. Thus, metal ions 27 can migrate mainly from positive electrode 20 into the interior of diffusion layer 42 of separator 40, but are unlikely to move actively from diffusion layer 42 to negative electrode 30. Separator 40 in such a secondary battery has a lower air resistance Rp in an in-plane direction than in the thickness direction, and the air resistance Rp is 100 sec or less. In the minimal charging step (S30) as described above, the charging is performed at an extremely low rate over one hour or more and also the potential of negative electrode 30 is maintained at or above the reduction potential of iron (Fe). Thus, in the minimal charging step (S30), the dissolved metal ions can stay somewhere between positive electrode 20 and diffusion layer 42 of separator 40, whereby their diffusion is significantly facilitated in in-plane directions of the diffusion layer 42. Because of this, metal ions 27 can be diffused almost uniformly over a wide range of the electrolyte solution in the diffusion layer 42. For instance, in the subsequent initial conditioning charging step (S40), when a potential difference is induced between the positive and negative electrodes and the potential of negative electrode 30 decreases below the reduction potential of iron (Fe), metal ions 27 diffused almost uniformly in the electrolyte solution are attracted all at once to the negative electrode 30 and precipitate out on the surface thereof. Instead of accumulating locally in a surface region of negative electrode 30 opposite the original location of metal contaminant 25 on the surface of positive electrode 20, metal ions 27 precipitate out in a sufficiently diffused state on the surface of negative electrode 30 as illustrated in (C). According to such a configuration, diffusion of metal ions 27 is sufficiently facilitated in in-plane directions of diffusion layer 42. Thus, deactivation can be completed, for instance, in even less time than in the first embodiment. For example, even when the metal contaminant 25 is relatively large, such as about 50 μm in diameter which is large enough to cause a short circuit, the metal contaminant 25 can be precipitated in a sufficiently diffused state on the negative electrode 30, thereby preventing precipitates 35 of metal contaminant 25 from causing a minor short circuit.

Third Embodiment

According to detailed studies by the present inventors, for instance, in the minimal charging step, the time required to dissolve a metal contaminant of a given size is further dependent on various factors. For instance, in addition to the environmental temperature, interelectrode voltage and dissolution rate of metal contaminant described already, differences in specifications and variations of secondary battery components can be considered. More specifically, as for the differences in specifications of secondary battery components, the influence of the types of active materials, the additive concentration in the electrolyte, etc., can be considered. In particular, for example, with increasing additive concentration in the electrolyte, there has been observed a tendency for a lower dissolution rate of metal contaminant. With respect to the variations of secondary battery components, differences in uncontrollable water contents of electrodes, state of metal contamination (degree of integration in the positive electrode active material, how wet with the electrolyte it is, etc.), degree of impregnation of the electrolyte in the electrodes and separator, and so on can be considered. Specifically, for instance, it has been observed that the dissolution rate of metal contaminant decrease, with increasing storage time of electrodes in a dry room, or when instantly exposed to the air. These are presumably due to increased water contents in electrolytes.

Hence, in the production method disclosed herein, also in view of the influence of these factors described above, it is possible to select a charge-maintaining time so as to bring about reliable deactivation in even less time. For example, in the production method disclosed herein, in accordance with the environment for deactivation or the state of the secondary battery, reliable deactivation is achieved in a time period more appropriate for the process by the following method. Beforehand, at a given charge-maintaining time, a metal contaminant (preferably an iron (Fe) particle) of a given size is placed on surfaces of positive electrodes. While varying other conditions (e.g. the environmental temperature and restraining pressure, herein), the minimal charging step is carried out. The relationships between the amount of metal contaminant dissolved at a given time and varied conditions (environmental temperature and restraining pressure) are then analyzed in advance. The best and shortest charge-maintaining time period can be thus selected at an actual environmental temperature.

FIG. 9 shows the relationship between the amount of iron (Fe) particle dissolved and environmental temperature when an iron (Fe) particle of 200 μm in diameter and 10 μm in thickness was placed on positive electrodes, and the minimal charging step was performed at an interelectrode voltage of 0.8 V for 10 hours of charge-maintaining time at varied environmental temperatures. In this example, the restraining pressure on the cell is also varied. In FIG. 9, it can be seen that in an environmental temperature range of 25° C. and above, the amount of iron (Fe) dissolved is little susceptible to the influence of environmental temperature, but in a temperature range below 25° C., with increasing restraining pressure, the amount dissolved decreases, requiring more time for dissolution. Thus, in accordance with the actual environmental temperature, the optimized charge-maintaining time can be selected to carry out the minimal charging step. More specifically, for instance, in FIG. 2, as indicated by Step C10, relative to standard charge-maintaining time in a prescribed temperature range selected in advance, when the actual environmental temperature is lower than the prescribed temperature range, the charging time can be selected longer than standard charge-maintaining time; and when higher than the prescribed temperature range, the charging time can be selected shorter than standard charge-maintaining time. The amount of time added to or subtracted from standard charge-maintaining time can be suitably determined based on the relationship shown in FIG. 9.

FIG. 10 shows the data in FIG. 9 as the relationship between the amount dissolved and restraining pressure. From FIG. 10, it can be found that in a non-restraining pressure range (0.1 MPa or less), the amount of iron (Fe) particle dissolved is not much affected, but with increasing restraining pressure in a restraining pressure range of 0.2 MPa and above, the amount dissolved decreases, requiring more time for dissolution. Thus, for instance, when subjecting secondary batteries in a form of a multi-cell battery to the minimal charging step, in accordance with the actual restraining pressure applied to the secondary batteries, an optimized charge-maintaining time can be selected to carry out the minimal charging step. As indicated by Step C20 in FIG. 2, relative to standard charge-maintaining time in a prescribed restraining pressure range selected in advance, when the actual restraining pressure is lower than the prescribed restraining pressure range, the charging time can be selected shorter than standard charge-maintaining time; and when higher than the prescribed temperature range, the charging time can be selected longer than standard charge-maintaining time. For assessing the relationship between the amount of iron (Fe) particle dissolved and restraining pressure during the minimal charging step, for instance, while secondary batteries 10 are restrained with a restrainer 300 as illustrated in FIG. 11, the relationship can be analyzed. According to such a constitution, relative to standard charge-maintaining time in a prescribed restraining pressure range selected in advance, when the actual restraining pressure is lower than the prescribed restraining pressure range, the charging time can be selected shorter than standard charge-maintaining time; and when higher than the prescribed temperature range, the charging time can be selected longer than standard charge-maintaining time.

In such a manner, by selecting a suitably optimized charge-maintaining time period in accordance with the actual environmental temperature and restraining pressure in the minimal charging step, the metal contaminant can be deactivated more efficiently.

In the present embodiment, the environmental temperature and restraining pressure are varied in the minimal charging step. However, other conditions can be varied to assess the relationships between the amount dissolved and these conditions in standard charge-maintaining time so as to select more suitable charge-maintaining time periods for cases where the other conditions are varied.

As shown in this embodiment, the minimal charging step can be performed on a single secondary battery or a multi-cell battery as a whole which is constructed by electrically connecting several secondary batteries. The multi-cell battery should just be in a form of several electrically connected single secondary batteries and is not limited by the presence of restraining pressure, amount of restraining pressure, etc. The arrangement of the several secondary batteries is not particularly limited, either. For instance, a cushioning called a spacer may be placed between adjacent cells, or secondary batteries may be in direct contact with one another. All the secondary batteries may be entirely contained in a given multi-cell battery case, or the secondary batteries may be fastened together through some part with a given multi-cell battery holder. For example, as illustrated in FIG. 11, a multi-cell battery can be constructed with a jig that can house secondary batteries and exert an arbitrary restraining pressure on the flat faces of the secondary batteries placed therein.

The restraining pressure referred to herein is applied in a direction almost vertical to the layer surfaces of the positive electrode and negative electrode (typically the same as the flat faces of secondary batteries), and can be applied to either a single secondary battery or a multi-cell battery. The restraining pressure can be determined, for instance, by using a load cell or strain gauge.

For the secondary battery of the present invention comprising a separator having the characteristic configuration described above, the detailed configuration, embodiment, capacity, application and so on are not particularly limited. The secondary battery of the present invention is described more in detail in view of the constitution in reference to an example of a lithium-ion battery as a preferable embodiment.

The lithium-ion battery in the present embodiment comprises an electrode assembly comprising a positive electrode, a negative electrode, and a separator placed between the positive electrode and the negative electrode, with the electrode assembly being placed, for instance, in a flat box-shaped battery case (see FIG. 11 for an example).

The positive electrode typically comprises a positive current collector and a positive electrode active material layer formed on a surface thereof, with the layer having a positive electrode active material. The positive electrode active material layer is typically formed on each face of the positive current collector, but can be formed on a single face as well. The negative electrode comprises a negative current collector and a negative electrode active material layer formed on a surface thereof, with the layer having a negative electrode active material. The negative electrode active material layer is typically formed on each face of the negative current collector, but can be formed on a single face as well.

As the positive current collector, a conductive member formed of a highly conductive metal can be preferably used, similarly to current collectors used in positive electrodes of conventional lithium secondary batteries (typically lithium-ion batteries). For instance, metals primarily comprising aluminum, nickel, titanium, iron, etc., or alloys formed primarily of these metals can be used. The shape of the positive current collector is not particularly limited. Various shapes can be considered in accordance with the shape of the lithium secondary battery. It may have various shapes, such as those of rods, plates, sheets, foil, meshes, etc. Typically, a sheet of positive current collector made of aluminum is used.

As the positive electrode active material, various substances usable as positive electrode active materials in a lithium-ion battery 10 can be used. More specifically, as the positive electrode active material, among various substances capable of storing and releasing lithium, one, two or more species can be used without particular limitations. As such a positive electrode active material, a lithium transition metal oxide (typically in a form of particles) is preferably used. A layered oxide or a spinel oxide can be suitably selected and used. For instance, it is preferable to use one, two or more species of lithium transition metal oxide selected among a lithium nickel-based oxide (typically $LiNiO_2$), a lithium cobalt-based oxide (typically $LiCoO_2$) and a lithium manganese-based oxide (typically $Li Mn_2O_4$).

As used herein, the term "lithium nickel-based oxide" encompasses an oxide comprising Li and Ni as metal components as well as a composite oxide comprising, besides Li and Ni, one, two or more other metals (i.e. transition metal(s) and/or main group metal(s) excluding Li and Ni) at a lower ratio (by number of atoms) than Ni (when two or more metals are included besides Li and Ni, each at a lower ratio than Ni). Such metal(s) can be, for instance, one, two or more species selected from a group consisting of Co, Al, Mn, Cr, Fe, V, Mg, Ti, Zr, Nb, Mo, W, Cu, Zn, Ga, In, Sn, La and Ce. The same applies to the lithium cobalt-based oxide and lithium manganese-based oxide as well.

The positive electrode active material can also be a lithium transition metal oxide of a so-called ternary (three-transition-metal) type as represented by a general formula:

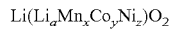

$Li(Li_aMn_xCo_yNi_z)O_2$ (in the formula, a, x, y and z satisfy a+x+y+z≈1, xyz≠0) or a lithium excess transition metal oxide of a so-called solid solution type as represented by a general formula:

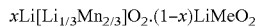

$xLi[Li_{1/3}Mn_{2/3}]O_2 \cdot (1-x)LiMeO_2$ (in the formula, Me is one, two or more species of transition metal; and x satisfies 0<x≤1).

Although these lithium transition metal oxides are represented by the general formulas to clarify their compositions, part (<50% by number of atoms) of the transition metal(s) in the rational formulas can be obviously replaced with one, two or more species selected from a group of metals consisting of Co, Al, Mn, Cr, Fe and so on listed above. Specifically, as the lithium transition metal oxide, it is preferable to use, for instance, a lithium excess transition metal oxide having a $D_{50}$ of about 3 μm to 8 μm and a specific surface area (BET method) of about 0.5 $m^2/g$ to 1.9 $m^2/g$. As the positive electrode active material, for instance, with the use of a lithium excess transition metal oxide, a solid solution-type lithium excess transition metal oxide, etc., a lithium-ion battery can be constituted to produce both high output performance and high-rate performance.

In the present description, $D_{50}$ indicates an average particle diameter represented by the 50th percentile (by volume) particle diameter in a size distribution measured by a laser diffraction scattering method. The terms $D_{50}$ and average particle diameter are used in the same sense hereinafter.

In addition, the positive electrode active material can be a polyanion-based compound represented by a general formula $LiMAO_4$ (M is at least one species of metal selected from a group consisting of Fe, Co, Ni and Mn; and A is selected from a group consisting of P, Si, S and V).

A compound constituting the positive electrode active material can be obtained, for instance, by preparation according to a known method. For example, some starting materials suitably selected in accordance with the composition of a positive electrode active material of interest are mixed at a prescribed ratio and the mixture is calcined by a suitable means. By this means, for instance, an oxide can be prepared as a compound to constitute the positive electrode active material. The method for preparing the positive electrode active material (typically a lithium transition metal oxide) by itself does not characterize the present invention.

In addition to the positive electrode active material, the positive electrode active material layer may comprise as necessary a conductive material, binder, etc. As the conductive material, a carbon material can be preferably used, such as carbon black (e.g. acetylene black, furnace black, Ketjen black), graphite powder and the like. Among these, solely one species or a combination of two or more species can be used. As the binder, a polymeric material either soluble or dispersible in water can be preferably used. Examples of a water-soluble polymeric material include cellulose-based polymers such as carboxymethyl cellulose (CMC), methyl cellulose (MC), cellulose acetate phthalate (CAP), hydroxypropyl methylcellulose (HPMC), etc.; polyvinyl alcohol (PVA); and the like. Examples of a water-dispersible polymeric material include vinylic polymers such as polyethylene (PE), polypropylene (PP), etc.; fluorine-based resins such as polyethylene oxide (PEO); polytetrafluoroethylene (PTFE), tetrafluoroethylene-perfluoroalkyl vinyl ether copolymers (PFA), etc.; vinyl acetate polymers; rubbers such as styrene-butadiene rubber (SBR), etc.; and the like. The binder is not limited to water-based kinds. A solvent-based binder such as polyvinylidene fluoride (PVDF) and the like can be used as well.

The amount of conductive material used is not particularly limited, but can be, for instance, 1 to 20 parts by mass (preferably 5 to 15 parts by mass) relative to 100 parts by mass of the positive electrode active material. The amount of binder used can be, for instance, 0.5 to 10 parts by mass relative to 100 parts by mass of the positive electrode active material.

As the negative current collector, a conductive member formed of a highly conductive metal is preferably used. For instance, it is preferable to use a copper material, nickel material, or an alloy primarily comprising these. The shape of negative current collector can be similar to the shape of positive current collector. In typical, a sheet of negative current collector made of copper is used.

As the negative electrode active material, a material capable of storing and releasing lithium is used, and one, two or more species can be used among negative electrode active materials conventionally used in lithium secondary batteries. Examples include carbon materials such as graphite, etc.; oxide materials such as lithium titanate ($Li_4Ti_5O_{12}$), etc.; metals or metal materials formed of such as tin, aluminum (Al), zinc (Zn), silicon (Si), and the likemetal alloys primarily comprising these metals; and the like. As a typical example, it is preferable to use a particulate carbon material (carbon particles) having a graphite structure (layer structure) at least partially. Any carbon material can be preferably used among a so-called graphitic substance (graphite), hard-to-graphitize carbonaceous substance (hard carbon), easy-to-graphitize carbonaceous substance (soft carbon), a non-crystalline carbon (amorphous carbon) and a substance having a structure combining these.

In addition to the negative electrode active material, the negative electrode active material layer formed on the negative electrode can comprise as necessary, for instance, one, two or more species of material that can be included in the positive electrode active material layer. As these material(s), a conductive material and a binder as those listed as components of the positive electrode active material layer as well as various materials capable of working as dispersant, etc., can be used similarly. A preferable binder is, but not limited to, a water-based kind. A solvent-based binder such as polyvinylidene fluoride (PVDF) and the like can be used as well.

The amount of conductive material used is not particularly limited, but can be, for instance, 1 to 30 parts by mass (preferably about 2 to 20 parts by mass, e.g. about 5 to 10 parts by mass) relative to 100 parts by mass of the negative electrode active material. The amount of binder used can be, for instance, 0.5 to 10 parts by mass relative to 100 parts by mass of the negative electrode active material.

The positive electrode and negative electrode according to the present embodiment can be produced by typical methods. In particular, an aforementioned active material, a binder and so on are dispersed in a suitable commonly used solvent (water, an organic solvent, etc.) to prepare a paste-like composition (or an active material layer-forming paste, hereinafter). The active material layer-forming paste is applied to a current collector, allowed to dry and compressed (pressed) to obtain an electrode comprising an active material layer on the current collector.

Since the separator has been described earlier, further description is omitted here.

The positive electrode and negative electrode thus fabricated are layered via a separator and wound to fabricate a wound electrode assembly. For this, in each of a long sheet of the positive electrode (positive electrode sheet) and a long sheet of the negative electrode (negative electrode sheet), an uncoated margin is reserved free of the active material layer at one end of the width direction vertical to the length direction. The positive electrode sheet and negative electrode sheet should be layered somewhat offset widthwise so that their uncoated margins protrude in opposite directions from the two widthwise edges of the separator. The layered electrode assembly is wound to obtain a wound electrode assembly, such that the negative electrode sheet is further on the outer circumference side. The resulting wound electrode assembly can be pressed and flattened out in a direction vertical to the winding axis (rotation axis) to obtain a flat wound electrode assembly.

The capacity ratio ($C_a/C_c$) of negative electrode to positive electrode is not particularly limited, but usually suitably, for instance, 1.0 to 2.0, or preferably 1.2 to 1.9 (e.g. 1.7 to 1.9). The negative electrode capacity ($C_a$(mAh)) is determined by multiplying the theoretical capacity (mAh/g) per unit mass of the negative electrode active material by the mass (g) of the negative electrode active material. The positive electrode capacity ($C_c$(mAh)) is determined by multiplying the theoretical capacity (mAh/g) per unit mass of the positive electrode active material by the mass (g) of the positive electrode active material. The capacity ratio of opposing negative and positive electrodes directly affects battery capacity (or irreversible capacity) and energy density. Depending on the conditions of use (e.g. rapid charging) of the battery, lithium precipitation is likely to occur. When the capacity ratio of opposing negative and positive electrodes is in the range, lithium precipitation can be preferably inhibited while maintaining battery properties such as battery capacity, energy density, etc. at favorable levels.

Subsequently, the wound electrode assembly is placed in a battery case. The battery case is, for instance, a square battery case, comprising a main casing and a lid. The main casing has a bottomed square cylinder shape, and is a flat, box-shaped container with one open face (e.g. top face). The lid is a member attached to the opening (top opening) of the main casing to close the opening. For instance, for a secondary battery installed in a vehicle, to increase the fuel efficiency of the vehicle, it is desired to increase the weight energy efficiency (battery capacity per unit weight). Thus, in the present embodiment, for the main casing and lid that constitute the battery case, a lightweight metal is preferably used, such as aluminum or an aluminum alloy. This can increase the weight energy efficiency. The lid typically comprises an injection hole through which an electrolyte solution is injected and a safety valve that opens when the pressure inside the battery case increases beyond a prescribed value. It also comprises an external positive terminal and an external negative terminal. While being electrically insulated from the battery case, the external positive terminal and external negative terminal are electrically connected to the uncoated margins of the positive and negative electrodes in the wound electrode assembly, for instance, via a positive electrode lead 22 and a negative electrode lead 32, respectively.

When the diffusion layer in the separator is formed of a conductive material, a system may be included to electrically connect, for instance, the diffusion layer and negative electrode. More specifically, for instance, around the winding end or like location of the wound electrode assembly, the diffusion layer of the separator is electrically connected to a conductive member (e.g. lead, tab, etc.). The battery case lid is provided with an external separator terminal protruding outward from the battery case. The external separator terminal is electrically connected to the conductive member linked to the separator's diffusion layer while being electrically insulated from the battery case. According to such a configuration, by electrically connecting the external negative terminal and external separator terminal protruding outward from the battery case, for instance, via an external connector (conductive cable, etc.), the negative electrode and diffusion layer can be electrically connected at a desired timing for a desired time period. Thus, it is possible to make the negative electrode and separator have the same potential just during the minimal charging step.

The system that allows a connection between the diffusion layer and negative electrode is not limited to a configuration that makes a connection outside the battery case. It may be configured to make a connection inside the battery case. For instance, the diffusion layer and negative electrode can be connected via a switch inside the battery case so that the negative electrode and the diffusion layer of the separator are electrically connected just during at least the minimal charging step.

The separator may be formed so that the diffusion layer thereof is exposed at the lengthwise end (i.e. winding end) of the separator so that the exposed portion can be connected to an external separator terminal, switch, etc., provided on the battery case.

The non-aqueous electrolyte comprises a lithium salt as a supporting salt in an organic solvent (non-aqueous solvent). A non-aqueous electrolyte in a liquid form at ordinary temperature (i.e. an electrolyte solution) can be preferably used. As the lithium salt, for instance, a suitable species can be selected for use from known lithium salts that have been conventionally used as supporting salts of non-aqueous electrolytes in lithium secondary batteries. Examples of such a lithium salt include $LiPF_6$, $LiBF_4$, $LiClO_4$, $LiAsF_6$, $Li(CF_3SO_2)_2N$, $LiCF_3SO_3$ and the like. These supporting salts can be used solely as one species or in combination of two or more species. A particularly preferable example is $LiPF_6$. As necessary, the non-aqueous electrolyte may also include various additives such as a gas-forming additive, surface film-forming additive, etc.

As the non-aqueous solvent, an organic solvent used in a general lithium secondary battery can be suitably selected and used. Examples of a particularly preferable non-aqueous solvent include carbonates such as ethylene carbonate (EC), dimethyl carbonate (DMC), ethyl methyl carbonate (EMC), diethyl carbonate (DEC), propylene carbonate (PC) and the like. These organic solvents can be used solely as one species or in combination of two or more species.

The secondary battery of the present invention is not limited to a particular application. As described above, the secondary battery according to the present embodiment allows reliably preventing, in short time, a metal contaminant mixed in the cell from causing an internal short circuit. Thus, it can be highly safe and reliable, and perform well, taking full advantage of its various properties. Accordingly, the secondary battery can be preferably used as a motor (electric motor) power source installed in a vehicle such as an automobile and the like, in particular. Such a secondary battery can be used solely or in a form of a multi-cell battery formed of several cells connected in series or in parallel.

A working example of the present invention is described next. The below is not to limit the present invention to these specific examples.

[Evaluation of Minimal Charging Step]
<Preparation of Test Cell>

A small-sized laminate cell was fabricated for testing according to the following procedures.

Firstly, with ion-exchanged water, were mixed lithium transition metal oxide ($LiNi_{1/3}Mn_{1/3}Co_{1/3}O_2$) of a ternary (three transition metals) type as a positive electrode active material, acetylene black (AB) as a conductive material and polyvinylidene fluoride (PVDF) as a binder to a mass ratio of these materials of 87:10:3 to prepare a positive electrode active material layer-forming paste. Subsequently, to a first surface of aluminum foil (15 μm thick) as a positive current collector, the positive electrode active material layer-forming paste was applied to 12 $mg/cm^2$ coating weight of positive electrode active material per unit area, and was allowed to dry. After dried, the resultant was rolled out into an approximately 90 μm thick sheet with a roller press machine and was slit to a prescribed width of positive electrode active material layer to prepare a positive electrode measuring approximately 23 mm by 23 mm in size.

Onto the active material layer of the thus-prepared positive electrode, were adhered model metal contaminant particles of 200 μm diameter and 10 μm thickness, made of Fe, as a metal contaminant.

Secondly, with ion-exchanged water, were mixed graphite as a negative electrode active material, styrene-butadiene block copolymer (SBR) as a binder and carboxymethyl cellulose (CMC) as a thickener to a mass ratio (%) of these materials of 98:1:1 to prepare a negative electrode active material layer-forming paste. Subsequently, to a first surface of copper foil (10 μm thick) as a negative current collector, the negative electrode active material layer-forming paste was applied to 6.5 $mg/cm^2$ coating weight of negative electrode active material per unit area, and was allowed to dry. After dried, the resultant was rolled out into an approximately 60 μm thick sheet with a roller press machine and was slit to a prescribed width of negative electrode active material layer to prepare a negative electrode measuring approximately 25 mm by 25 mm in size.

A separator used had a three-layer structure formed of a metal mesh placed between two sheets of microporous film and measured approximately 27 mm by 27 mm in size. The metal mesh is a plain weave ø 10 μm SUS304 wire mesh of 40 μm opening size. The two sheets of microporous film are 10 μm in thickness and made of polyethylene. These have been overlaid and lightly pressed with heat to form a single entity. This separator has an air resistance Rt of 100 s/mL in the thickness direction and an air resistance Rp of 80 s/mL in an in-plane direction.

For comparison, was obtained a separator formed of polypropylene/polyethylene/polypropylene three-layer microporous film (PP/PE/PP film) The separator of the comparative example has an air resistance Rp of greater than 100 s/mL in an in-plane direction and an air resistance Rt in the thickness direction smaller than the air resistance Rp in the in-plane direction.

<Construction of Test Cell>

Using the positive electrode, negative electrode and separator obtained above, laminate test cells were constructed as a working example and a comparative example. In particular, the prepared positive electrode and negative electrode were layered via the separator with the active material layers of the two electrodes facing each other to fabricate an electrode assembly. To the positive electrodes, negative electrodes, and the separator's metal mesh layer of the working example, were attached positive electrode leads, negative electrode leads and a separator lead, respectively. In this embodiment, for measuring the respective potentials vs. lithium of the positive electrodes, negative electrodes and separators, reference electrodes formed by attaching nickel leads to pieces of lithium metal foil were placed on the negative electrode-side surfaces of the separators away from the negative electrodes.

Subsequently, the electrode assembly was placed along with a non-aqueous electrolyte solution into a battery case having a laminate pouch form and sealed to construct a test lithium secondary battery. The non-aqueous electrolyte (electrolyte solution) used was prepared by dissolving 1 mol/L of $LiPF_6$ (LPFO) as a lithium salt along with 0.05 mol/L of $Li[B(C_2O_4)_2]$ as an additive in a 3:3:4 (by volume) solvent mixture of ethylene carbonate (EC), dimethyl carbonate (DMC) and ethyl methyl carbonate (EMC). 0.025 mL of the electrolyte solution was used and the electrolyte solution was impregnated over five hours.

Such a small-sized laminate cell for testing has a capacity of 3.7 mAh.

<Minimal Charging Step>

As illustrated in FIG. 8(B), with respect to a laminate test cell of the working example constructed above, negative electrode 30 and diffusion layer 42 of separator 40 were electrically connected to equalize their potentials. Subsequently, with negative electrode 30 and separator 40 being arranged in parallel, a cell was connected between them and positive electrode 20, and the minimal charging step was carried out under the following conditions. In particular, the cell was CC-charged at 0.015 mA (0.004 C) to an interelectrode voltage of 0.8 V. While keeping the interelectrode voltage constant, CV-charging was conducted for a total charging time selected from the following five time periods: 1 hour, 5 hours, 10 hours, 15 hours and 20 hours. With respect to the laminate test cell of the comparative example, a cell was connected across negative electrode 30 and positive electrode 20, and the minimal charging step was performed under the same conditions as the laminate test cell of the working example.

At the end of the prescribed time period of minimal charging, as illustrated in FIG. 8(C), negative electrode 40 and diffusion layer 42 were electrically disconnected. To observe the state of diffusion of the metal contaminant, constant-current charging (CC-charging) was continued to an interelectrode voltage of 4.1 V. After stored in this state for 20 minutes, the conditioning process was carried out by constant-current discharging (CC-discharging) to 3 V. FIG. 12 shows the voltage profile when the minimal charging step was carried out for 10 hours.

<Evaluations>

After the minimal charging step, the test cells were disassembled, and the positive electrodes, negative electrodes and separators were observed on each face with an optical microscope. FIG. 13 and FIG. 14 show the observation results of the test cells of the working example and comparative example, respectively, with (A) showing some images observed on separator surfaces on the negative electrode side and (B) showing images observed on the negative electrode surfaces. In FIG. 13 and FIG. 14, on separator surfaces (A) on the negative electrode side, there were observed reddish brown areas formed by precipitation of diffused Fe ions. From comparison of FIG. 13 and FIG. 14, it was confirmed that by the minimal charging step performed on the secondary battery of this invention, when the Fe-made model metal contaminant particle placed on the positive electrode dissolved, it was deposited, diffused over a wider range on the negative electrode.

Based on the images (A) observed on the negative electrode-side surface of the separator shown in FIG. 13 and FIG. 14, the relationship was studied between the minimal charging time and diffusion diameter over which the Fe-made model metal contaminant particle dissolved and diffused, and illustrated in FIG. 15. The diffusion diameter was determined by identifying the outline of the area in which precipitation from the model particles was visually observed in each electron microscope image obtained and determining the equivalent circle diameter of the area. To assess the equivalent circle diameter variance due to the visual outline identification, with respect to each electron microscope image, the projected area was determined five times. The resulting standard deviation $1\sigma$ was found sufficiently negligible in comparison with the standard deviation $1\theta$ of diffusion diameter among 10 cells (n=10). Such variance of diffusion area among cells may arise from "the state of the metal contaminant model particles mixed therein" such as the degree of integration of the metal contaminant model particles into the electrode, the state of contact with the electrolyte solution, etc.

From FIG. 15, it was found that by minimal charging of the secondary battery of this invention, the diffusion area of metal contaminant was increased; and, for instance, by 20 hours of minimal charging, the diffusion area of metal contaminant was increased by as much as about 35%.

Although charging is carried out continuously in the minimal charging process, since the charge amount is actually minute, a button cell, dry cell and the like can provide useful voltages as the cell for charging. Accordingly, the effect obtained by the minimal charging step can more than offset any cost increase associated with the continuous charging in this step.

For the secondary battery disclosed herein, even if a metal contaminant is mixed in during the cell construction, a subsequent minimal charging process can facilitate diffusion of the metal contaminant and deactivate it to a preferable state. Thus, it can be a highly safe and reliable secondary battery in which problems such as the occurrence of a minor short circuit are prevented. For instance, as shown in FIG. 16, such a secondary battery 10 (which can be a multi-cell battery 100 formed of several series-connected secondary batteries 10) can be preferably used as a driving power supply installed in a vehicle 1 (typically an automobile, particularly an automobile comprising an electric motor, such as a hybrid automobile, electric automobile, etc.).

According to the lithium secondary battery production method disclosed herein, it is possible to produce a lithium secondary battery in which the occurrence of a minor short circuit caused by a metal contaminant is prevent, in less time and in a productive manner. Thus a highly reliable secondary battery can be produced at a lower cost.

The present invention has been described above in view of preferred embodiments although not limited to these. The present invention naturally includes various modifications.

REFERENCE SIGNS LIST 1 vehicle
10 lithium-ion cell
20 positive electrode
22 positive electrode lead
25 metal contaminant
27 metal ions
30 negative electrode
32 negative electrode lead
35 precipitate
40 separator
42 diffusion layer
44 conductive member
50 external positive terminal
60 external negative terminal
70 external separator terminal
75 switch
80 battery case
90 safety valve
100 multi-cell battery
200 air resistance tester
202, 202A specimens
204, 204A fasteners
204B attachment
206, 206A inner cylinders
300 restrainer

The invention claimed is:

1. A method for producing a secondary battery comprising a positive electrode, a negative electrode, and a separator placed between the positive electrode and the negative electrode, the method comprising
  a step of constructing a cell comprising a positive electrode, a negative electrode, and a separator having an air resistance Rp of 100 seconds or less in an in-plane direction vertical to its thickness direction and an air resistance Rt in the thickness direction higher than the air resistance Rt in the in-plane direction, wherein the separator includes a diffusion layer;
  a step of placing the constructed cell in a battery case, the battery case is provided with a system that electrically connects the diffusion layer and the negative electrode at least during a minimal charging step;
  the minimal charging step comprising charging the cell to 0.01% to 0.5% of the cell capacity at a charge current of 0.01 C or less over at least one hour to obtain a state of charge such that the positive electrode has a potential equal to or above the oxidation potential of a probable metal contaminant and the negative electrode has a potential equal to or above the reduction potential of the probable metal contaminant, with the step further comprising maintaining the state of charge, wherein the charging in the minimal charging step is performed while the diffusion layer and the negative electrode are electrically connected; and a step of performing initial conditioning charging, wherein the air resistance is measured based on the air resistance test method specified in JIS P 8117:2009 and represents a time (second) required for 100 mL of air to pass through a specimen of a unit surface area, from its one face to other face in a thickness direction, under a unit pressure difference, and the probable metal contaminant is at least one selected from the group consisting of iron, copper, tin, zinc, and an alloy thereof.

2. The method for producing a secondary battery according to claim 1, wherein the cell is constructed, using, as the separator, a separator having a multi-layer structure formed of two or more layers including a porous resin layer, and the diffusion layer is formed from a conductive material or an insulating material and has an air resistance Rp of less than 100 seconds in an in-plane direction vertical to the thickness direction.

3. The method for producing a secondary battery according to claim 1, wherein the diffusion layer is formed of one, two or more species selected from a group consisting of a porous body, a non-woven fabric and a woven fabric.

4. The method for producing a secondary battery according to claim 1, wherein the diffusion layer is formed from a conductive material.

5. The method for producing a secondary battery according to claim 1, wherein the minimal charging step is carried out by constant-current, constant-voltage charging, and the state of charge is maintained for 5 hours or more, but 20 hours or less.

6. The method for producing a secondary battery according to claim 1, further comprising, after the initial conditioning charging step, a self-discharge test step in which the charged cell is subjected to a measurement of voltage drop, and the self-discharge test step is completed in 12 hours or less.

* * * * *